US011929680B2

(12) United States Patent
Shen

(10) Patent No.: US 11,929,680 B2
(45) Date of Patent: Mar. 12, 2024

(54) ADAPTIVE CURRENT CONTROL IN SWITCHING POWER REGULATORS FOR FAST TRANSIENT RESPONSE

(71) Applicant: Google LLC, Mountain View, CA (US)

(72) Inventor: Wei Shen, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 17/636,891

(22) PCT Filed: Mar. 24, 2020

(86) PCT No.: PCT/US2020/024424
§ 371 (c)(1),
(2) Date: Feb. 20, 2022

(87) PCT Pub. No.: WO2021/194474
PCT Pub. Date: Sep. 30, 2021

(65) Prior Publication Data
US 2022/0337162 A1 Oct. 20, 2022

(51) Int. Cl.
*H02M 3/158* (2006.01)
*H02M 1/00* (2006.01)
*H02M 3/157* (2006.01)

(52) U.S. Cl.
CPC ....... *H02M 3/1586* (2021.05); *H02M 1/0009* (2021.05); *H02M 3/157* (2013.01)

(58) Field of Classification Search
CPC .. H02M 3/1586; H02M 1/0009; H02M 3/157; H02M 1/0025
See application file for complete search history.

(56) References Cited

U.S. PATENT DOCUMENTS 7,863,875 B1 1/2011 Guo et al.
9,768,676 B1 9/2017 Shen et al.
(Continued)

FOREIGN PATENT DOCUMENTS

WO 2021194474 9/2021

OTHER PUBLICATIONS

"Foreign Office Action", IN Application No. 202247023563, dated Nov. 10, 2022, 6 pages.
(Continued)

*Primary Examiner* — Adolf D Berhane
*Assistant Examiner* — Afework S Demisse
(74) *Attorney, Agent, or Firm* — Colby Nipper PLLC

(57) ABSTRACT

The present disclosure describes various aspects of adaptive current control in switching power regulators for fast transient response. In some aspects, a clock of a switching power regulator is prevented, in response to detecting a transient load, from affecting application of current to an inductor of the regulator. A first switch device applies current to the inductor of the regulator until inductor current reaches a maximum current level. A second switch device then enables the current to flow through the inductor until the inductor current reaches a current control signal based on an output voltage of the switching power regulator. In some aspects, an offset is also applied to the current control signal to further increase average inductor current. These operations may be repeated without interruption from the clock to quickly increase the inductor current, and thus current provided to the regulator output in response to the transient load.

20 Claims, 13 Drawing Sheets

(56) References Cited

U.S. PATENT DOCUMENTS

| | | |
|---|---|---|
| 9,929,663 B1 | 3/2018 | Babazadeh et al. |
| 2009/0224731 A1* | 9/2009 | Tang .................. H02M 3/1584 323/241 |
| 2017/0237345 A1* | 8/2017 | Manlove .............. H02M 3/156 323/274 |

OTHER PUBLICATIONS

"International Preliminary Report on Patentability", Application No. PCT/US2020/024424, dated Sep. 22, 2022, 13 pages.
"International Search Report and Written Opinion", Application No. PCT/US2020/024424, dated Nov. 6, 2020, 20 pages.
Corradini, et al., "Current-Limited Time-Optimal Response in Digitally Controlled DC-DC Converters", IEEE Transactions on Power Electronics, vol. 25, Nov. 2010, 12 pages.
Liu, et al., "A Fast Transient Recovery Module for DC-DC Converters", IEEE Transactions on Industrial Electronics, vol. 56, No. 7, Jul. 2009, 8 pages.
Rossetti, et al., "Valley Design Techniques Outperform Peak Current-Mode Approach for CPU Supplies", Jul. 1, 2001, 7 pages.

* cited by examiner

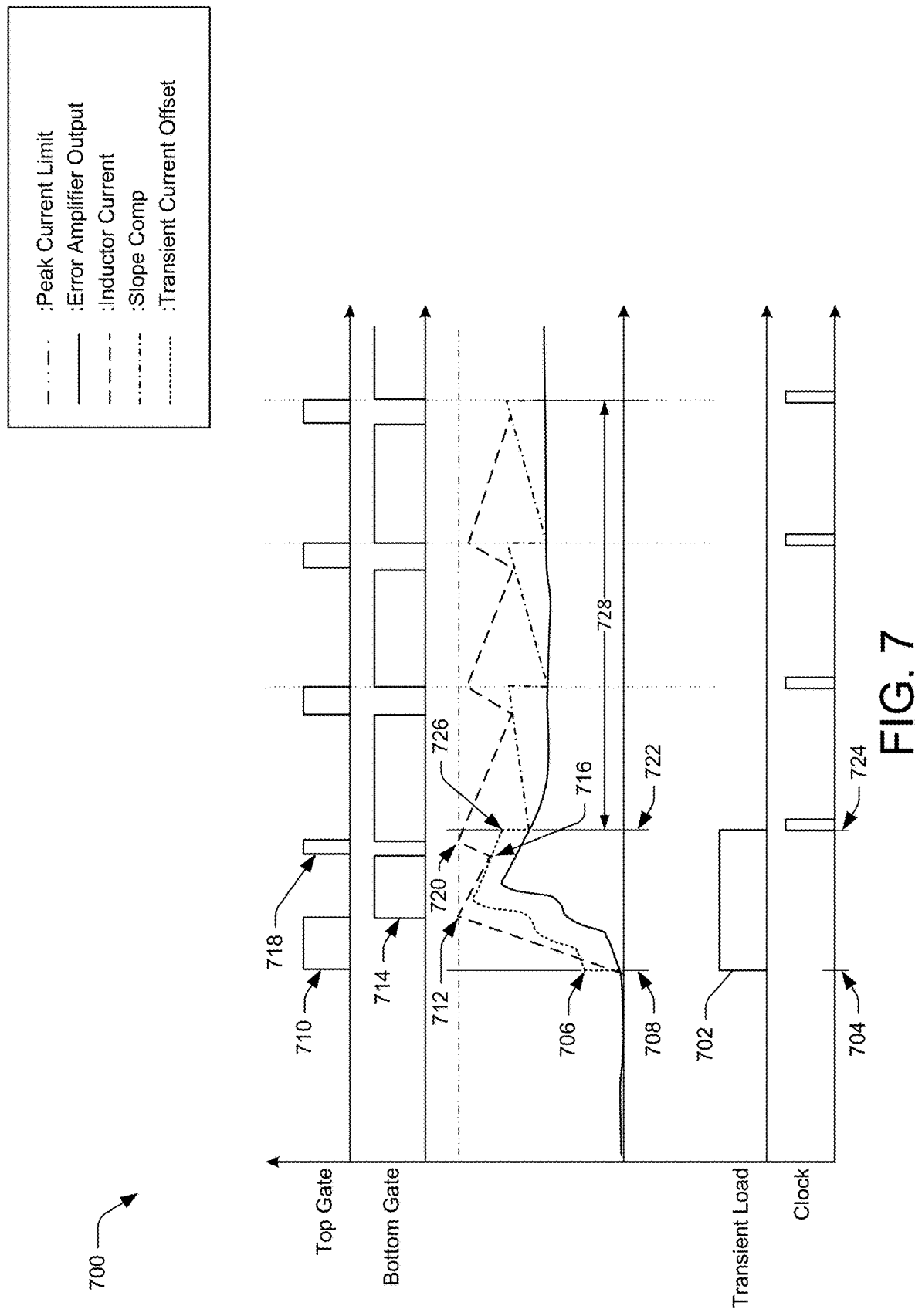

ADAPTIVE CURRENT CONTROL IN SWITCHING POWER REGULATORS FOR FAST TRANSIENT RESPONSE

RELATED APPLICATION(S)

This application is a national stage entry of International Application No. PCT/US2020/024424, filed Mar. 24, 2020, the disclosure of which is incorporated herein by reference in its entirety.

BACKGROUND

Switching power supplies are often used to provide power to a wide variety of components in computing and electrical devices. Generally, a switching power supply regulates power received at one voltage to another voltage at which the power is provided to the components of a device. In some cases, current draw of the device's components may substantially increase during operation, which may be referred to as a transient load or load step. If unable to meet this increased current draw, an output voltage of the switching power supply decreases or droops until the switching power supply recovers. Before this occurs, however, the low or drooping voltage at the output of the switching power supply may render the device inoperable when the components shut down or fail to operate at the low voltage. Some device manufacturers attempt to address supply voltage droop by increasing capacitance at the output of the switching regulator. Increasing a number or size of output capacitors, however, increases circuit complexity, consumes valuable layout area, and increases overall device cost.

SUMMARY

This disclosure describes apparatuses of and techniques for adaptive current control for fast transient response. In various aspects, an increase of a load at an output of a switching power regulator (switching regulator) is detected. In response to detecting the increase of the load, a clock of the switching regulator is prevented from affecting application of current to an inductor of the switching regulator. A first switch device of the switching regulator applies current to the inductor until the inductor current reaches a maximum or peak current level. A second switch device of the switching regulator then enables the current to flow through the inductor until the inductor current reaches a current control signal. The current control signal is provided based on an output voltage of the switching power regulator. Additionally, an offset may be applied to the current control signal to further increase average inductor current (e.g., more-quickly reactivate the first switch device). These operations may be repeated without interruption from the clock to quickly increase the inductor current, and thus current provided to the output of the switching regulator, to respond to the increase of the load at the output. Consequently, during load transients, the adaptive current control mode helps to relieve the pressure to increase control loop bandwidth, which in turn may increase the noise immunization of the regulator.

In some aspects, a method implemented by a switching power regulator increases output current in response to an increase of a load at the switching power regulator. The method detects the increase of the load at an output of the switching power regulator. In response to the increase of the load, the method initiates an adaptive current control mode of the switching power regulator in which a clock of the switching power regulator is prevented from affecting application of current to an inductor of the switching power regulator. The method includes implementing a first phase of the adaptive current control mode in which the current is applied, via a first switch device and from an input of the switching power regulator, to the inductor of the switching power regulator until inductor current reaches a predefined level for maximum current.

The method also includes implementing a second phase of the adaptive current control mode in which the current is enabled to flow, via a second switch device and from a potential lower than the input of the switching power regulator, through the inductor until the inductor current reaches a current control signal that is based on an output voltage of the switching power regulator. The method detects a reduction of the load at the output while the switching power regulator operates in the adaptive current control mode. In response to the reduction of the load at the output, the method includes transitioning the switching power regulator to operate in a steady state mode in which the clock of the switching power regulator affects the application of the current to the inductor of the switching power regulator.

In other aspects, a circuit for regulating power comprises a first switch device coupled to an input of the circuit, an inductor having a first terminal coupled to the first switch device and a second terminal coupled to an output of the circuit, and a second switch coupled between the first terminal of the inductor and a potential lower than the output of the circuit, which is typically grounded. The circuit also includes first and second sense circuitry configured to provide first and second indications of current flow through the first and second switch devices, respectively. A clock of the circuit is operably coupled to drive circuitry of the first switch device and the second switch device. The circuit also includes a current comparator having an output operably coupled to the drive circuitry and a first input operably coupled to the second sense circuitry and an error amplifier having an input operably coupled to the output of the circuit and an output coupled to a second input of the current comparator.

An adaptive current controller associated with the circuit is configured to detect an increase of a load at the output of the circuit and cause, in response to the increase of the load, the circuit to operate in an adaptive current control mode in which the clock of the circuit is prevented from affecting application of current to the inductor of the circuit. The controller implements a first phase of the adaptive current control mode in which the current is applied, via the first switch device, to the inductor until the first indication of current flow through the inductor reaches a predefined level for maximum current. The controller then implements a second phase of the adaptive current control mode in which the current is enabled to flow, via the second switch device, through the inductor until the current comparator determines that the second indication of current flow through the inductor reaches a current control signal provided via the output of the error amplifier. The controller is also configured to detect a reduction of the load at the output while the switching power regulator operates in the adaptive current control mode. In response to the reduction of the load at the output, the controller causes the circuit to operate in a steady state mode in which the clock of the circuit affects the application of the current to the inductor of the circuit.

In yet other aspects, a method implemented by a switching power regulator increases output current in response to a transient load on the switching power regulator. The method comprises detecting the transient load at an output of the switching power regulator and masking, in response to detecting the transient load, a clock signal of the switching power regulator to prevent the clock signal from interrupting an application of current to an inductor of the switching power regulator. The method includes activating a first switch device of the switching power regulator to initiate the application of the current to the inductor of the switching power regulator and senses, at a first node operably coupled to the first switch device, an amount of the current flowing in the inductor to provide a first indication of current flow in the inductor. In response to the first indication of current flow meeting a predefined threshold for maximum inductor current, the first switch device is deactivated.

The method then activates, in response to deactivating the first switch device, a second switch device of the switching power regulator to enable the current to continue to flow through the inductor and senses, at a second node operably coupled to the second switch device, the amount of current flowing in the inductor to provide a second indication of current flow in the inductor. When the second switch device is activated, the second indication of current flow is compared to a control signal that is based on an output voltage of the switching power regulator. In response to the second indication of current flow meeting the control signal, the second switch device is deactivated and the first switch device is activated to reinitiate the application of the current to the inductor of the switching power regulator effective to increase the amount of the current flowing in the inductor and to the output of the switching power regulator.

The details of one or more implementations of adaptive current control in switching power regulators for fast transient response are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the subject matter of the appended claims.

BRIEF DESCRIPTION OF THE DRAWINGS

This disclosure describes apparatuses of and techniques for adaptive current control for fast transient response with reference to the following drawings. The use of same or similar reference numbers throughout the description and the figures may indicate like features or components:

FIG. 7 illustrates an example graph of inductor current regulated in accordance with one or more aspects of adaptive current control.

DETAILED DESCRIPTION

Figure 1:
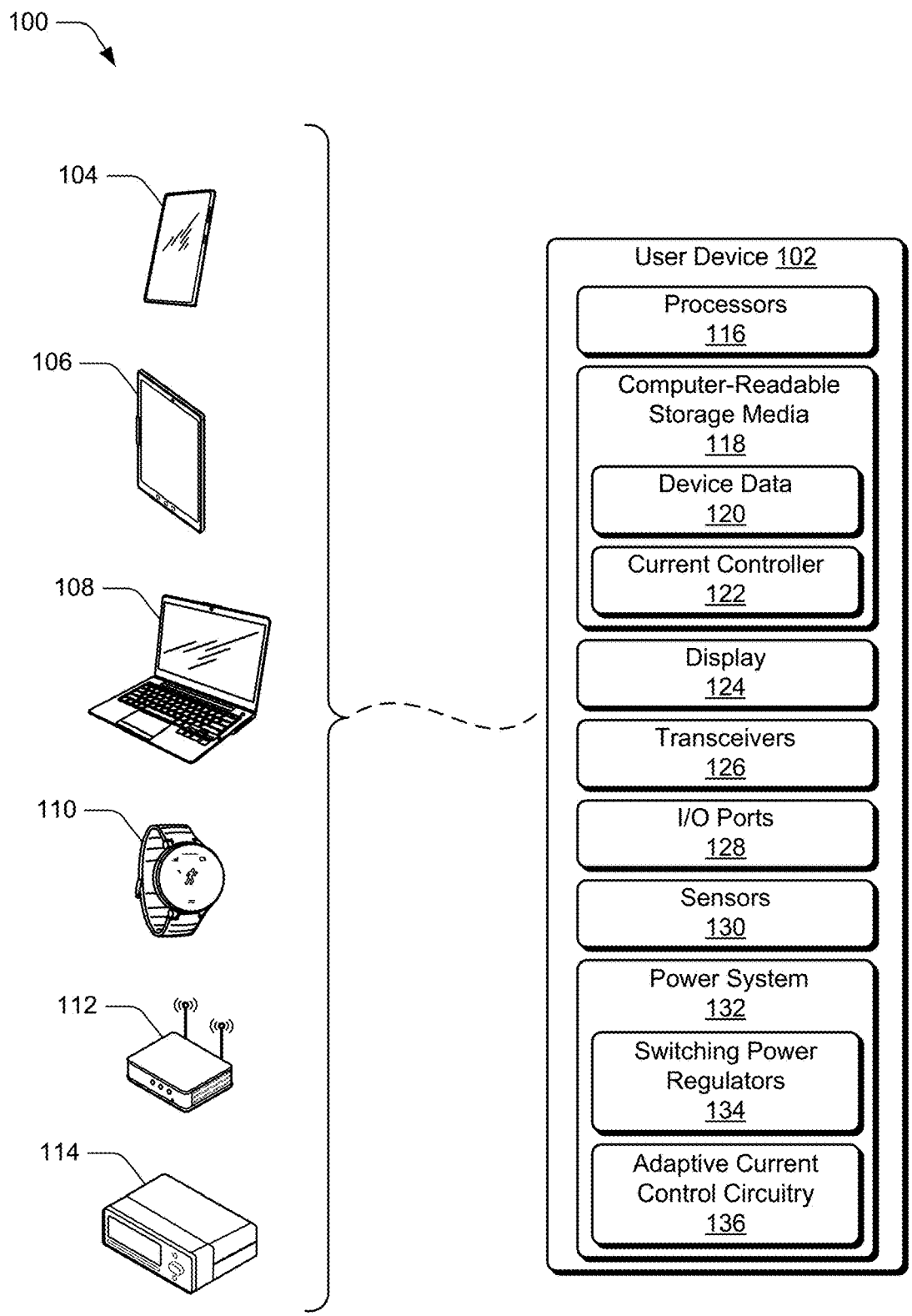
FIG. 1 illustrates an example operating environment that includes user devices that include a switching power regulator and capable of implementing various aspects of adaptive current control for fast transient response.

Conventional techniques for regulating power often implement pulse-width modulation (PWM) for controlling current applied to energy storage elements, such as an inductor, of a power supply circuit. Generally, a switch is used to modulate the application of current to the inductor based on a duty cycle of a PWM waveform or pulse train generated by logic of the power supply circuit. In some cases, the PWM control is implemented with a fixed frequency in which cycles of the PWM scheme are managed by a clock signal that controls the application of current during or at the end of a given modulation cycle. One example of a power regulator that implements fixed frequency switching is a leading-edge modulation current-mode (e.g., valley-mode) regulator, which is used for powering mobile device processor core rails (e.g., for central and graphics processing units (CPUs and GPUs)). Leading-edge current-mode modulation may include low-side current sensing, which alleviates a restriction on duty ratio and/or switching frequency associated with high-side sensing, cycle-by-cycle inductor current regulation that enables easier implementation of multi-phase current sharing, and a fixed switching frequency that enables multi-phase operation without the use of a complex phase-locked loop (PLL) for phase synchronization. As such, a power management integrated-circuit (PMIC) that implements leading-edge current-mode control or valley-mode control is often used to power CPU, GPU, and/or memory power rails in battery-operated devices.

The fixed frequency nature of a leading-edge current-mode PMIC, however, may impair performance of the PMIC with respect to transient loads or high current steps, such as increasing current slew rates of the CPU and GPU typically associated with mobile devices. Conventional solutions for addressing poor transient load performance include adding or increasing a size of output capacitors on the power supply at additional cost and increase in design volume, or limiting CPU speed, which directly impairs user experience. A leading-edge current-mode PMIC may also perform poorly when regulating power at lower voltages associated with CPUs and GPUs. Generally, the leading-edge current-mode modulation, also referred to as valley-current control mode, can be treated as an inverse of logic for implementing peak-current control mode in many ways. Therefore, a small-signal model of the peak-current control mode could be applied to valley-current control mode, with low-side current sensing instead of high-side current sensing of the peak-current control mode. While the low-side current sensing reduces complexity of low output voltage regulation (e.g., high input/output duty ratio), performance of a valley-mode current comparator may deteriorate for low output voltage due to noise issues. Various slope compensation schemes may mitigate the noise issue, however, the resulting loop gain and bandwidth of the leading-edge design would be more restrictive than the trailing-edge (or peak-current) control, for the same low duty cycle cases. For these reasons, more expensive and complex constant-on time (COT) control PMICs are typically used for lower voltage applications instead of the leading-edge current-mode control or valley-current control PMICs.

In contrast with conventional leading-edge current-mode or valley-current control schemes, this disclosure describes aspects of adaptive current control for fast transient response. Generally, the described aspects provide for improving a response to transient loads (e.g., load step or high current slew rate) by increasing inductor current, and thus output current, and then enabling a switching regulator to transition (e.g., after responding to the transient load with increased current) to fixed frequency operation of a valley-current control mode for steady state operations (e.g., under minimal or nominal current loads).

In some aspects, an adaptive current control-enabled switching regulator includes a high-side switch by which current is applied to an inductor, and thus an output, of the switching regulator. Generally, an efficient way to deliver current to the inductor is to turn on the high-side switch all the way until a maximum or peak current limit of the switching regulator (e.g., an inductor or high-side switch current limit) is reached. Unlike conventional valley-current control modes, an adaptive current control mode may mask or disable a clock signal of the switching regulator that typically turns off the high-side switch. By disabling the clock signal, the switching regulator may manage current flow into the inductor based on the peak current limit and a valley-current comparator configured for adaptive current control. Thus, a valley-current level of the inductor current may be controlled using the valley-current comparator based on an offset output of an error amplifier (e.g., $V_C$) in combination with the peak current limit. In some aspects, a current sensing offset may be introduced to the output of the error amplifier to increase the level of valley-current, thereby increasing average inductor current by increasing the threshold for minimum current flow through the inductor. Doing so, the adaptive current control mode may respond to a transient load with increased levels of peak and/or average current to greatly reduce or decrease voltage droop at the output of the switching regulator. This increased current may reduce voltage droop for a same amount of output capacitance or allow a designer to use less output capacitance for a given amount of voltage droop, thereby reducing cost and design volume allocated to the output capacitance.

By way of example, when a load step is applied to an output of a switching regulator implementing adaptive current control, a control loop of the switching regulator may respond based on the output of the error amplifier (e.g., $V_C$). As a worst case scenario, consider when the switching regulator wakes from a light load pulse-frequency modulation (PFM) mode to the load step demand on the output with a high slew rate, such as tens of A/μSec for a current-intensive processor. In various aspects, an adaptive current controller may generate, in response to the transition from the PFM mode to a PWM mode, a pulse signal to mask or disable operation of a clock of the switching regulator and apply an offset to the output of the error amplifier. As the transient load subsides and steady state operation approaches, generation of the pulse signal ceases and the clock signal and/or slope compensation signal are restored for steady state operation. In some cases, this adaptive current control mode or control loop is more tolerable to variance of operation conditions (e.g., various load demand levels) and circuit component values, such as output capacitor quantity or sizing.

Generally, the pulse signal is generated with an appropriate timing and length effective to increase current for a fast transient response and seamlessly transition or return to steady state clock-based operation of the switching regulator. As described herein, there are various implementation by which to generate or derive the adaptive current control pulse signal, such as based on output voltage dip detection, error voltage rising edge, error current of an operational transconductance amplifier, or combination of the like. By implementing this and other aspects of adaptive current control, output current of the switching regulator can be increased or maximized based on load demand (or load request), and overshoot for smaller load steps may be reduced. Alternatively or additionally, adaptive current control may be applied to single-phase switching regulators or multi-phase switching regulators as described throughout the disclosure.

In various aspects, a user device includes a switching power regulator and an adaptive current controller (current controller) implemented in accordance with one or more aspects of adaptive current control. The current controller detects an increase of a load (e.g., transient load) at an output of the switching power regulator (switching regulator). In response to detecting the increase of the load, the current controller prevents a clock of the switching regulator from affecting application of current to an inductor of the switching regulator. The current controller activates a first switch device of the switching regulator to apply current to the inductor until inductor current reaches a maximum current level. The current controller then activates, while the first switch device is inactive, a second switch device of the switching regulator to enable the current to flow through the inductor until the inductor current reaches a current control signal or threshold. The current control signal is provided based on an output voltage of the switching regulator. Additionally, an offset may be applied to the current control signal to further increase average inductor current in response to activation of the first and second switch devices. These operations may be repeated without interruption from the clock to quickly increase the inductor current, and thus current provided to the output of the switching regulator, to respond to the increase of the load at the output. By so doing, the switching regulator can respond to a transient load by quickly increasing current flow through the inductor and reduce or mitigate voltage droop at the output of the switching regulator.

The following discussion describes an operating environment, techniques that may be employed in the operating environment, and various devices or systems in which components of the operating environment can be embodied. In the context of the present disclosure, reference is made to the operating environment by way of example only.

Example Environment

FIG. 1 illustrates an example environment 100 that includes a user device 102 in which aspects of adaptive current control for fast transient response can be implemented. The user device 102 may be implemented as any suitable device, some of which are illustrated as a smartphone 104, a tablet computer 106, a laptop computer 108, a wearable computing device 110 (e.g., smart-watch), a broadband router 112 (e.g., mobile hotspot), and automotive computing system 114 (e.g., navigation and entertainment system). Although not shown, the user device 102 may also be implemented as any of a mobile station (e.g., fixed- or mobile-STA), a mobile communication device, a client device, a user equipment, a mobile phone, an entertainment device, a gaming device, a mobile gaming console, a personal media device, a media playback device, a health monitoring device, a drone, a camera, a wearable smart-device, an Internet home appliance capable of wireless Internet access and browsing, an IoT device, and/or other types of user devices. The user device 102 may provide other functions or include components or interfaces omitted from FIG. 1 for the sake of clarity or visual brevity.

The user device 102 includes one or more processors 116 and computer-readable media 118, which may include memory media or storage media. The processors 116 may be implemented as a general-purpose processor (e.g., of a multicore central-processing unit (CPU) or application processor (AP)), an application-specific integrated circuit (ASIC), graphics processing unit (GPU), or a system on chip (SoC) with other components of the user device 102 integrated therein. The computer-readable media 118 can include any suitable type of memory media or storage media, such as read-only memory (ROM), programmable ROM (PROM), random access memory (RAM), dynamic RAM (DRAM), static RAM (SRAM), or Flash memory. In the context of this discussion, the computer-readable media 118 of the user device 102 is implemented as at least one hardware-based or physical storage device, which does not include transitory signals or carrier waves. Applications, firmware, and/or an operating system (not shown) of the user device 102 can be embodied on the computer-readable media 118 as processor-executable instructions, which may be executed by the processor 116 to provide various functionalities described herein. The computer-readable media 118 may also store device data 120, such as user data or user media that is accessible through the applications, firmware, or operating system of the user device 102.

In this example, the computer-readable media 118 also includes an adaptive current controller 122 (current controller 122) which is described throughout the disclosure. Generally, the current controller 122 may implement one or more aspects of adaptive current control to increase an amount of current provided to an inductor of a switching regulator, such as in response to an increase of a load on the switching regulator. In some cases, the current controller 122 masks a clock signal, masks a slope compensation signal, applies an offset to an output of an error amplifier, and so on. Alternatively or additionally, the current controller 122 may implement an adaptive current control mode in which a clock signal is prevented from affecting or interrupting application of current to the inductor of a switching regulator. In accordance with the adaptive current control mode, the current controller 122 may implement a control loop in which inductor current is controlled based on a maximum current level of the inductor and low-side sensing based on an offset output of an error amplifier. By so doing, the current controller 122 may increase an amount of current provided to an output of the switching regulator, such as in response to a load step or transient load. How the current controller 122 is implemented and used varies, and is described throughout the disclosure.

The user device 102 may also include a display 124, transceivers 126, I/O ports 128 and/or sensors 130. The display 124 may be operably coupled with one of the processors 116 (e.g., graphics processing unit (GPU)) and configured to graphically present an operating system or applications of the user device 102. The transceivers 126 may be configured to enable wired or wireless communication of data (e.g., device data 120) over wired or wireless networks according to any suitable communication protocol. The I/O ports 128 of the user device 102 may include USB ports, coaxial cable ports, and other serial or parallel connectors (including internal connectors) useful to couple the user device to various components, peripherals, or accessories such as keyboards, microphones, or cameras.

The user device 102 also includes sensors 130, which enable the user device 102 to sense various properties, variances, stimuli, or characteristics of an environment in which the user device 102 operates. For example, the sensors 130 may include various motion sensors, ambient light sensors, acoustic sensors, capacitive sensors, infrared sensors, temperature sensors, radar sensors, or magnetic sensors. Alternatively or additionally, the sensors 130 may enable interaction with, or receive input from, a user of user device 102, such as through touch sensing or proximity sensing. In some aspects of adaptive current control, the current controller 122 can monitor a sensor 130, such as to receive temperature data or feedback via one of the sensors 130. Based on the temperature data, the current controller 122 may alter a magnitude or duration of an offset or pulse signal when implementing adaptive current control.

The power system 132 provides regulated power to the components of the user device 102, such as the processors 116, CRM 118, display 124, transceivers 126, I/O ports 128, or sensors 130. In this example, the power system 132 includes one or more switching power regulators 134 (switching regulator 134) and adaptive current control circuitry 136 (ACC circuitry 136). The switching regulators 134 may be configured to provide power at different respective voltage levels for the various components of the user device 102. For example, one of the switching regulators 134 may include a multi-phase switching regulator configured to step battery power (e.g., 3.7 to 4.2 V) or external power (e.g., 5.0 V) down to a voltage (e.g., 0.750 V) at which the processors 116 consume power to operate.

The ACC circuitry 136 may implement one or more aspects of adaptive current control, such as generating a pulse signal to mask a clock of a switching regulator 134 or provide an offset to an output of an error amplifier or other current control threshold. The current controller 122 may interact with the ACC circuitry 136 to implement various aspects described herein, such as by configuring predefined current thresholds, predefined ramp signals, or predefined offsets that are useful to increase current provided to an output of a switching regulator. How the ACC circuitry 136 is implemented and used varies, and is described throughout the disclosure.

Figure 2:
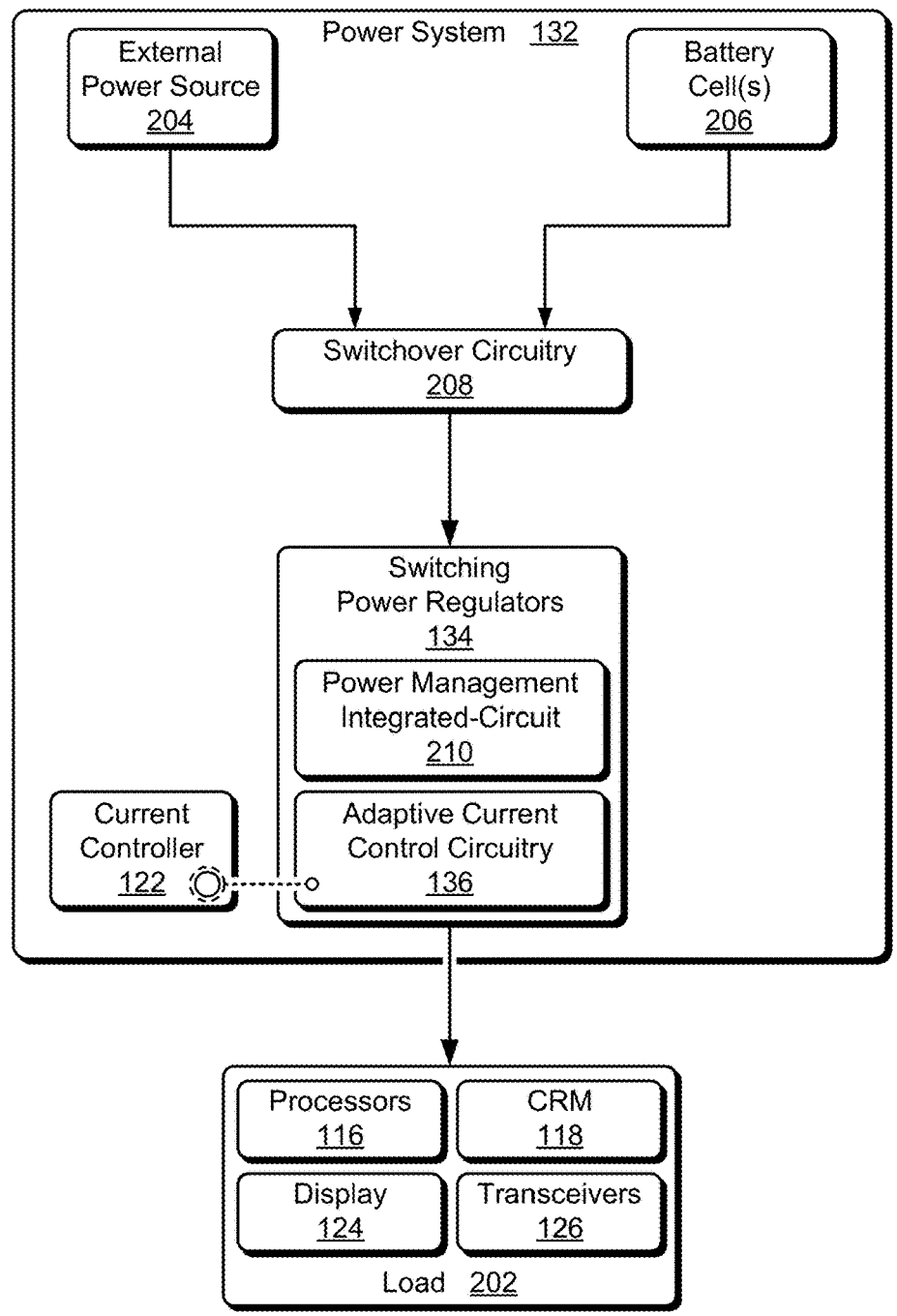
FIG. 2 illustrates an example of a power system that includes an adaptive current controller and adaptive current control circuitry shown in FIG. 1.

FIG. 2 illustrates at 200 an example of a power system that includes an adaptive current controller 122 and ACC circuitry 136 shown in FIG. 1. In this example, the power system 132 is operably coupled to a load 202 of the user device 102, which includes the processors 116, CRM 118, display 124, and transceivers 126 of the user device 102. The power system 132 may receive input power from an external power source 204 (e.g., external AC/DC adapter) or one or more battery cells 206 of a battery or battery pack electrically coupled to the user device 102. Switchover circuitry 208, which may include charging or other power management circuits, electrically couples the external power source 204 or the battery cell 206 to the switching regulators 134.

Generally, the switching regulators 134 regulate power provided by the external power source 204 or the battery cell 206 to provide power to the components of the user device 102 (e.g., load 202) at a voltage at which the components operate. For example, each of the switching regulators 134 may be configured as a single-phase or multi-phase switching regulator to provide power at different respective voltages, such as 3.3 volts (e.g., for the display 124), 1.8 volts (e.g., for the CRM 118), 1.0 volt, 0.9 volts, 0.7 volts (e.g., for the processors 116), and so on. Voltage regulation and other functionalities of a switching regulator 134 may be controlled by a power management integrated-circuit 210 (PMIC 210), which may include registers and logic for implementing one or more power regulation schemes, such as PFM, PWM, valley-current mode, adaptive current control mode, or the like.

In various configurations, the user device 102 and components of the user device 102, such as the processors 116 and transceivers 126 may feature multiple operating or power states, such as fully on, idle, standby, sleep, deep sleep, and off. Alternatively or additionally, some components (e.g., CPUs or GPUs) may also be configurable for different performance states, such as maximum performance, nominal performance, power saving, and the like. Accordingly, operating power and current consumed by the user device 102 and the components of the user device, such as load 202, may vary depending on an operational state, operating state transition, or use of the user device 102 (or individual components). In some cases, a change in operating state or processing demand of the user device 102 generates a corresponding increase in current demand on the switching regulators. For example, when waking from a low-power state to a fully active state, the processors 116 (e.g., CPU and GPU) may create a transient load or load step in current demand (e.g., tens of A/µsecond) on one of the switching regulators 134 that is configured to provide power to a processor power rail.

The switching regulators 134 also include or are associated with the ACC circuitry 136, which may interact with the current controller 122 to implement aspects of adaptive current control. In some cases, the ACC circuitry 136 or current controller 122 interact with the PMIC 210 to affect or control operation of a switching regulator 134. For example, the ACC circuitry 136 may generate a pulse to mask a clock signal of the PMIC 210 or switching regulator 134 or offset, via an adding block or comparator, an output of an error amplifier that provides a current control signal based on an output of the switching regulator 134. In some aspects, the current controller 122 interacts with the PMIC 210 to detect or receive an indication of a switching regulator mode (e.g., PFM or PWM), or an indication of a transition between switching regulator modes (e.g., PFM to PWM). Alternatively or additionally, an instance of the current controller 122 may be embodied on the PMIC 210, a microcontroller, or other logic configured to manage operation of the switching regulator 134.

Figure 3:
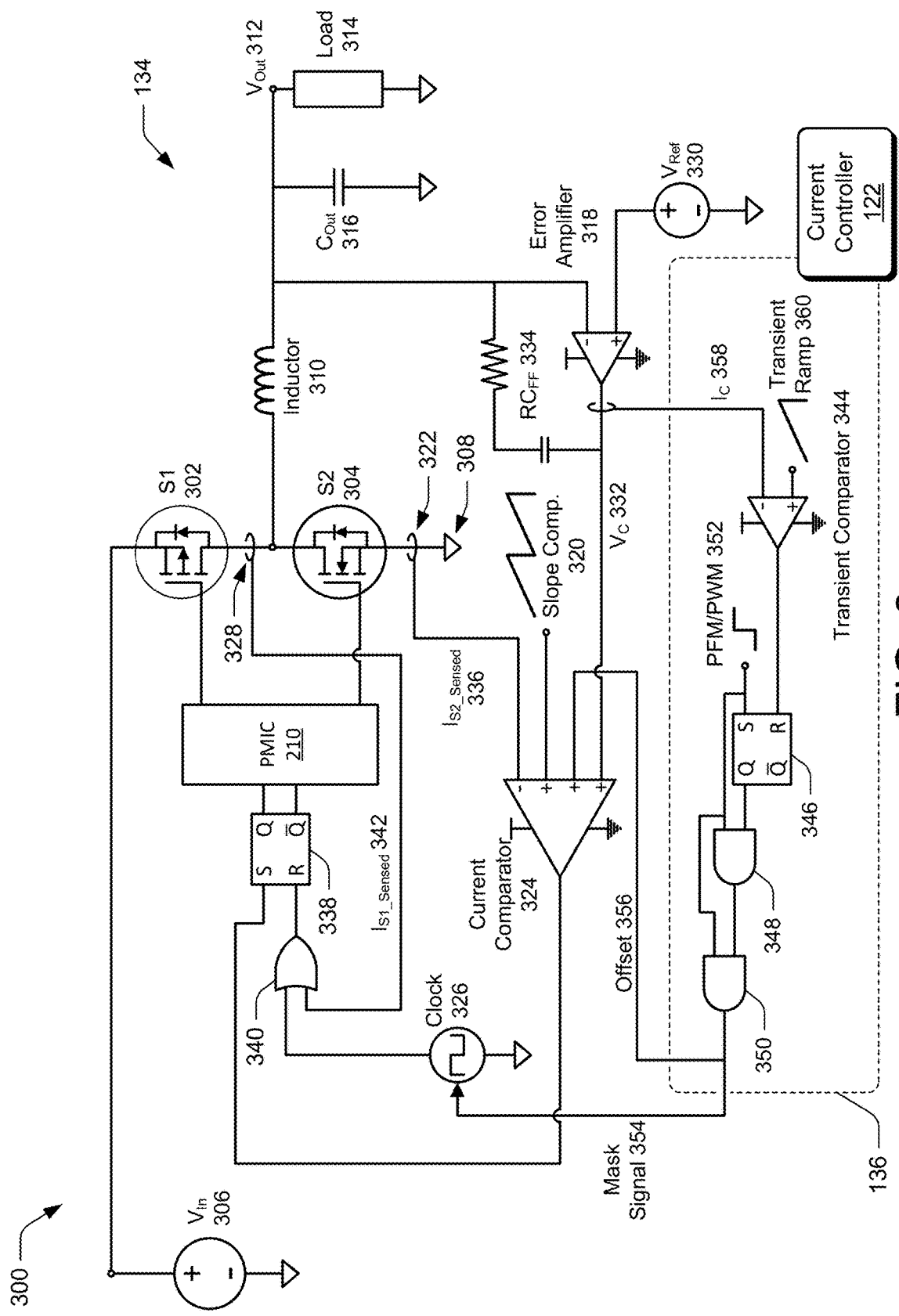
FIG. 3 illustrates an example configuration of a single-phase switching power regulator that includes adaptive current control circuitry.

FIG. 3 illustrates at 300 an example configuration of a single-phase switching regulator that includes ACC circuitry. In this example, an instance of adaptive current control circuitry 136 and a current controller 122 are operably coupled with a switching regulator 134 configured as a single-phase regulator. The illustrated components and architecture of FIG. 3 are presented as a non-limiting example of ways in which adaptive current control can be implemented. As such, the aspects described herein may be applied or extended to any suitable switching power circuit to implement various features of adaptive current control. Further any coupling or connection between various components may be direct or indirect, such as made through one or more intervening components. For visual brevity and/or clarity, some unrelated or redundant components (e.g., sense resistors or op-amps) or circuitry may also be omitted from this or other circuit diagrams. Such an omission is not to be construed as limiting, but rather one example of the many ways in which various aspects may be used or applied to circuitry for implementing adaptive current control. In other words, the aspects (e.g., circuitry) described herein may also be implemented with any suitable number or combination of logic, registers, sense circuitry, amplifiers, current mirrors, comparators, or the like.

As shown in FIG. 3, the switching regulator 134 (regulator 134) includes a first switch device 302 and a second switch device 304 coupled between an input power source 306 and a lower potential, which is illustrated as ground 308. An inductor 310 of the regulator 134 is coupled between a switch node disposed between the first and second switch devices 302 and 304 and an output 312 of the regulator 134. Generally, the first and second switch devices 302 and 304 regulate, based on drive signals provided by the PMIC 210, an application and flow of current from the input power source 306 through the inductor 310 to the output 312 of the regulator 134. A load 314 (e.g., load 202) is coupled to the output 312, which may be modeled as a resistive or variable load on the regulator 134. The regulator 134 also includes output capacitance, illustrated as output capacitor 316, which may represent any suitable number, type, or size of output capacitors coupled to the output 312.

The regulator 134 is capable of operating in multiple control modes, such as a valley-current control mode and an adaptive current control mode (e.g., hybrid-stitch mode). In this example, control circuitry and signals of the regulator 134 include an error amplifier 318, a slope compensation ramp signal 320, low-side sense circuitry 322, a current comparator 324, and a clock 326. Alternatively or additionally, the control circuitry of the regulator 134 may also include high-side sense circuitry 328 to sense current (e.g., peak current) flowing through the first switch device 302 into the inductor 310. In various aspects, the error amplifier 318 receives an indication of voltage at the output 312 of the regulator and a reference voltage 330 to provide a control signal 332 ($V_C$ 332), error voltage, or current control signal to the current comparator 324. In some implementations, the error amplifier 318 may include a feed-forward resistor-capacitor network 334 ($RC_{FF}$ 334) to introduce a phase boost to compensate for a pole of a transfer function of the regulator 134. Generally, the error amplifier 318 will generate an output or control signal 332 that attempts to force a voltage at the output 312 of the regulator 134 to match the reference voltage 330. As such, the error amplifier output or control signal 332 may indicate a degree, threshold, or level from which the output current of the regulator 134 should increase (e.g., from a voltage droop) to return to or meet a target voltage (e.g., 0.750 V) for power regulation.

The current comparator 324 may, such as during valley-current control, add the slope compensation ramp signal 320 to the control voltage 332 to provide a slope compensated signal for controlling current modulation of the regulator 134. The current comparator 324 may compare an indication of current 336 ($I_{S2\_Sensed}$ 336) provided by the low-side sense circuitry of current flowing through the second switch device 304 with the slope compensated signal to provide an output signal to set a reset-set flip-flop 338 (RS flip-flop 338). The RS flip-flop 338 is operably coupled to the PMIC 210 and may selectively control or activate drive circuitry for the first switch device 302 or the second switch device 304. In some cases, the RS flip-flop 338 is set when the current comparator detects or determines that the indication 336 of current (e.g., valley-current) falls to or meets the compensated signal, at which point the first switch 302 is activated and the second switch 304 is deactivated.

Based on the output of the RS flip-flop 338, the first switch device 302 may apply current from the input power 306 to the inductor 310 to increase current flow in the inductor. In valley-current control, the first switch device 302 remains active and applies current to the inductor until the clock 326 resets the RS flip-flop 338, such as through an OR gate 340. As such, in steady state operation or a valley-current control mode, current of the inductor 310 may be modulated based on the slope compensated signal and indication of low-side switch current in one phase of operation and the clock 326 in a second phase of operation. The OR gate 340 may also receive an indication of current 342 ($I_{S1\_sensed}$ 342) provided by the high-side sense circuitry of current flowing through the first switch device 302 to enable modes of adaptive current control.

In aspects of adaptive current control, the ACC circuitry 136 and/or the current controller 122 may manage or affect operation of components of the regulator 134 to increase current provided at the output 312, such as in response to a transient load or load step. The current controller 122 or ACC circuitry 136 may implement an adaptive current control mode in which operation of the regulator (e.g., inductor current flow) is managed during a first phase based on a maximum current limit for the inductor 310 and during a second phase based on an offset current control signal, such as an offset output of the error amplifier 318. For example, the adaptive current controller 122 or circuitry 136 may mask a signal of the clock 326, apply an offset to control voltage 332 (e.g., a current control signal), or mask the slope compensation signal 320 from the current comparator 324. As shown in FIG. 3, the ACC circuitry 136 is coupled to an output of the error amplifier 318, the clock 326 (e.g., clock circuit enable line), and the current comparator 324 of the regulator 134. In this example, the ACC circuitry 136 includes a transient comparator 344, an RS flip-flop 346, and AND gates 348 and 350, which are coupled to an output of the RS flip-flop 346. Generally, the ACC circuitry 136 may generate one or more signals, such as a pulse or masking signals, with appropriate timing and length effective to cause the regulator 134 to provide an increased amount of current to quickly respond to a transient load or load step. The ACC circuitry 136 may then seamlessly transition or return the regulator 134 to steady state clock-based operation with minimal overshoot.

The current controller 122 may initiate adaptive current control or an adaptive current control mode in response to any suitable indication of a transient load or transient step on the output 312 of the regulator 134. In this example, a set input of the RS flip-flop 346 is coupled to an output of the PMIC 210 (not shown), logic, or another entity (e.g., current controller 122) to receive an indication 352 of when the regulator 134 transitions a pulse-frequency modulation (PFM) mode (e.g., light current load) to a pulse-width modulation (PWM) mode (e.g., increased/heavy current load). Alternatively or additionally, the current controller 122 may initiate adaptive current control in response to detecting a dip in output voltage at the output 312 or detecting a rising edge of output voltage provided by the error amplifier 318.

Returning to FIG. 3, in response to the PFM/PWM transition 352, an output of the RS flip-flop 346 transitions to generate a mask signal 354 to the clock and an offset 356 to the current comparator. In some cases, the mask signal 354 and/or the offset 356 are or correspond to a start or initiation of an adaptive pulse during which the regulator 134 operates in an adaptive current control mode (e.g., initiates adaptive current control). The mask signal and offset signals 354, 356 may be provided separately (e.g., without the other) or combined, or buffered via the AND gates 348 and 350. The mask signal 354 may mask a clock signal of the clock 326, disable a clock circuit, or otherwise prevent the clock 326 from interrupting or altering an application of current by the first switch device 302 to the inductor 310. In some cases, the offset 356 is applied to a current control signal, such as the control signal 332 provided by the error amplifier 318, to alter a current control threshold (e.g., valley-current threshold) and enable an increased amount of current to flow in the inductor 310. Alternatively or additionally, the offset 356 or another signal generated by logic of the ACC circuitry 136 may mask or disable the slope compensation signal 320 while the regulator 134 operates in the adaptive current control mode.

In some aspects, the transient comparator 344 generates a signal that is or corresponds to an end or termination of the adaptive pulse during which the regulator 134 operates in the adaptive current control mode (e.g., terminates adaptive current control). In this example, an output of the transient comparator 344 of the ACC circuitry 136 is coupled to the reset input of the RS flip-flop 346, which generates the mask signal 354 and offset 356. As shown in FIG. 3, a first input of the transient comparator 344 may be coupled to the output of the error amplifier 318 to receive an indication 358 of a voltage- or current-based output of the error amplifier 318. Another input of the transient comparator 344 is coupled to a source of a transient ramp signal 360, though any fixed or variable threshold may be used.

Generally, the transient comparator 344 may compare the output of the error amplifier 318 to the transient ramp 360 (or other signal) to detect a reduction of a load on the output 312 of the regulator 134. In some cases, the reduction of the load is detected relative to an increased amount of current provided to the output 312 by the adaptive current control mode and/or an amount of time for which the regulator 134 implements adaptive current control. As such, the transient ramp signal 360 may be configured or predefined to reduce overshoot for small current steps or when the regulator 134 operates with adaptive current control for longer durations of time (e.g., longer than 50 µseconds).

In response to the indication 358 of the error amplifier output meeting or falling below the transient ramp 360, the output of the transient comparator 344 transitions positive to reset the RS flip-flop 346, which ceases to generate the mask signal 354 to the clock 326 and the offset 356 to the current comparator 324. Alternatively or additionally, the reset of the RS flip-flop 346 may also unmask or restore application of the slope compensation signal 320 to the current comparator 324 at the end of the adaptive current control mode. As such, generation of the variable pulse that masks the clock 326 or corresponds to operation in accordance with the adaptive current control mode may be initiated based on the PFM/PWM transition 352 and terminated by the transient comparator 344. The transient comparator 344 may compare the output of the error amplifier 318 and the transient ramp signal 360, or any suitable variable or fixed signal.

In some aspects, the error amplifier 318 is implemented as an operational transconductance amplifier (OTA) that provides a current-based output signal or error current based on the output voltage of the regulator and the reference voltage 330. Because the current-based output signal or output current of the OTA amplifier is a derivative of the current control signal Vc 332, a zero is effectively introduced into the adaptive current control loop, which may increase the control bandwidth. In such an implementation, the ACC circuitry 136 may also include current-to-voltage (I/V) blocks or transimpedance amplifiers (not shown) coupled between the error amplifier 318 and current comparator 324 or between the error amplifier 318 and transient comparator 344.

Thus, in some aspects of adaptive current control, the transient comparator 344 compares the error amplifier current with a predefined voltage (e.g., transient ramp 360) to determine when to reset the flip-flop 346 or end the variable-length pulse generated by adaptive current control that alters operation of the regulator 134 to increase inductor current. In some cases, the ACC circuitry 136 includes a current mirror (not shown) coupled to the output of the error amplifier 318 such that the transient comparator 344 compares a mirror of error amplifier current with the predefined voltage or transient ramp signal 360. Alternatively or additionally, any of the signals described with respect to the error amplifier 318, current comparator 324, and/or transient comparator 344 may be implemented as voltage-based or current-based signals, with respective I/V or V/I blocks disposed between source and destination components as appropriate.

Figure 4:
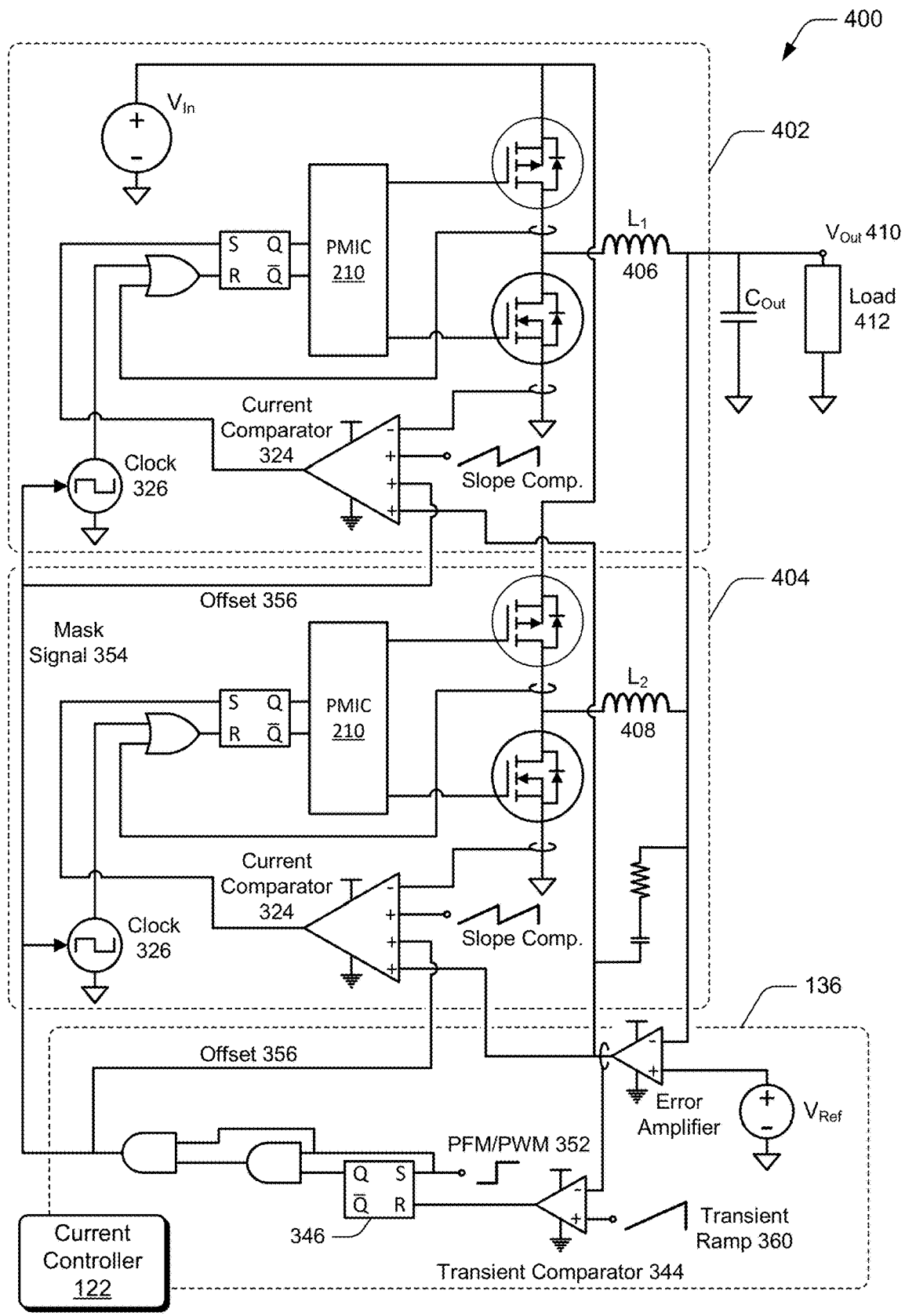
FIG. 4 illustrates an example configuration of a multi-phase switching power regulator that includes adaptive current control circuitry.

As another example, consider FIG. 4 which illustrates an example configuration of a multi-phase switching regulator 400 (multi-phase regulator 400) that includes ACC circuitry. Generally, aspects of adaptive current control may be applied to multi-phase regulators configured with any suitable number of phases, such as two phases, three phases, four phases, and so on. In this example, the multi-phase regulator 400 is configured as a two-phase regulator with a first phase 402 and a second phase 404, though the described aspects may be applied or extended to additional phases. As shown in FIG. 4, a first inductor 406 of the first phase 402 and a second inductor 408 of the second phase 404 are coupled to the output 410 of the multi-phase regulator 400. With respect to the phase 402 and/or phase 404, other components or signals associated with the phases may be configured similar to or differently from corresponding elements as described with respect to the single-phase regulator of FIG. 3.

In this example, the ACC circuitry 136 is operably coupled to the respective clocks 326 and current comparators 324 of the first phase 402 and second phase 404 of the multi-phase regulator 400. In some aspects, the current controller 122 and/or ACC circuitry 136 may initiate adaptive current control or an adaptive current control mode in response to any suitable indication of a transient load or transient step on the output 410 of the multi-phase regulator 400. For example, in response to a PFM/PWM transition 352, the ACC circuitry 136 may generate and provide mask signal 354 to the clocks 326 and offset signal 356 to the current comparators 324 of the multi-phase regulator 400 to increase current flow through inductors 406 and 408.

In at least some aspects, an advantage of adaptive current control includes the convenience and ease to command all phases of the multi-phase regulator 400 to reach maximum inductor current ramp rate. This is due to the mask signal 356 blocking or deferring the normal clock signal and/or using a same peak current and error amplifier voltage to control respective inductor currents of each phase at a same time. Alternatively or additionally, with the load step dependent derivation of the variable-length pulse (e.g., transient pulse by ACC circuitry 136), a phase shedding signal (not shown) may also be masked to ensure that each and all phases of the multi-phase regulator operate (e.g., turn on) at the same time. On termination of the adaptive current control mode, this will not affect the phase shedding after the transient pulse ends (e.g., restoration of clocks 326 and slope compensation signals), so any impact on regulator efficiency is minimal.

The ACC circuitry 136 may also end or terminate adaptive current control mode operation of the multi-phase regulator when the transient load subsides. For example, in response to the output of the error amplifier output meeting or falling below the transient ramp 360, the output of the transient comparator 344 transitions positive to reset the RS flip-flop 346, which ceases to generate the mask signal 354 to the clocks 326 and the offset 356 to the current comparators 324. Alternatively or additionally, the reset of the RS flip-flop 346 may also unmask or restore application of the slope compensation signal 320 to the current comparators 324 at the end of the adaptive current control mode. As such, generation of the variable-length pulse that masks the clocks 326 or corresponds to operating in accordance with the adaptive current control mode may be initiated based on the PFM/PWM transition 352 and terminated by the transient comparator 344 based on the output of the error amplifier 318 and the transient ramp signal 360 (or any suitable variable or fixed signal).

Example Methods

Example methods 500, 600, and 900 are described with reference to FIG. 5, FIGS. 6A and 6B, and FIG. 9, respectively, in accordance with one or more aspects of adaptive current control for fast transient response. Generally, the methods 500, 600, and 900 illustrate sets of operations (or acts) that may be performed in, but not necessarily limited to, the order or combinations in which the operations are shown herein. Further, any of one or more of the operations may be repeated, combined, reorganized, skipped, or linked to provide a wide array of additional and/or alternate methods. In portions of the following discussion, reference may be made to the environment 100 of FIG. 1, circuitry or components of FIG. 2 through FIG. 4, a system of FIG. 12, and/or entities detailed in FIG. 1 or other figures, reference to which is made for example only. The techniques and apparatuses described in this disclosure are not limited to an embodiment or performance by one entity or multiple entities operating on one device or those described with reference to the figures.

Figure 5:
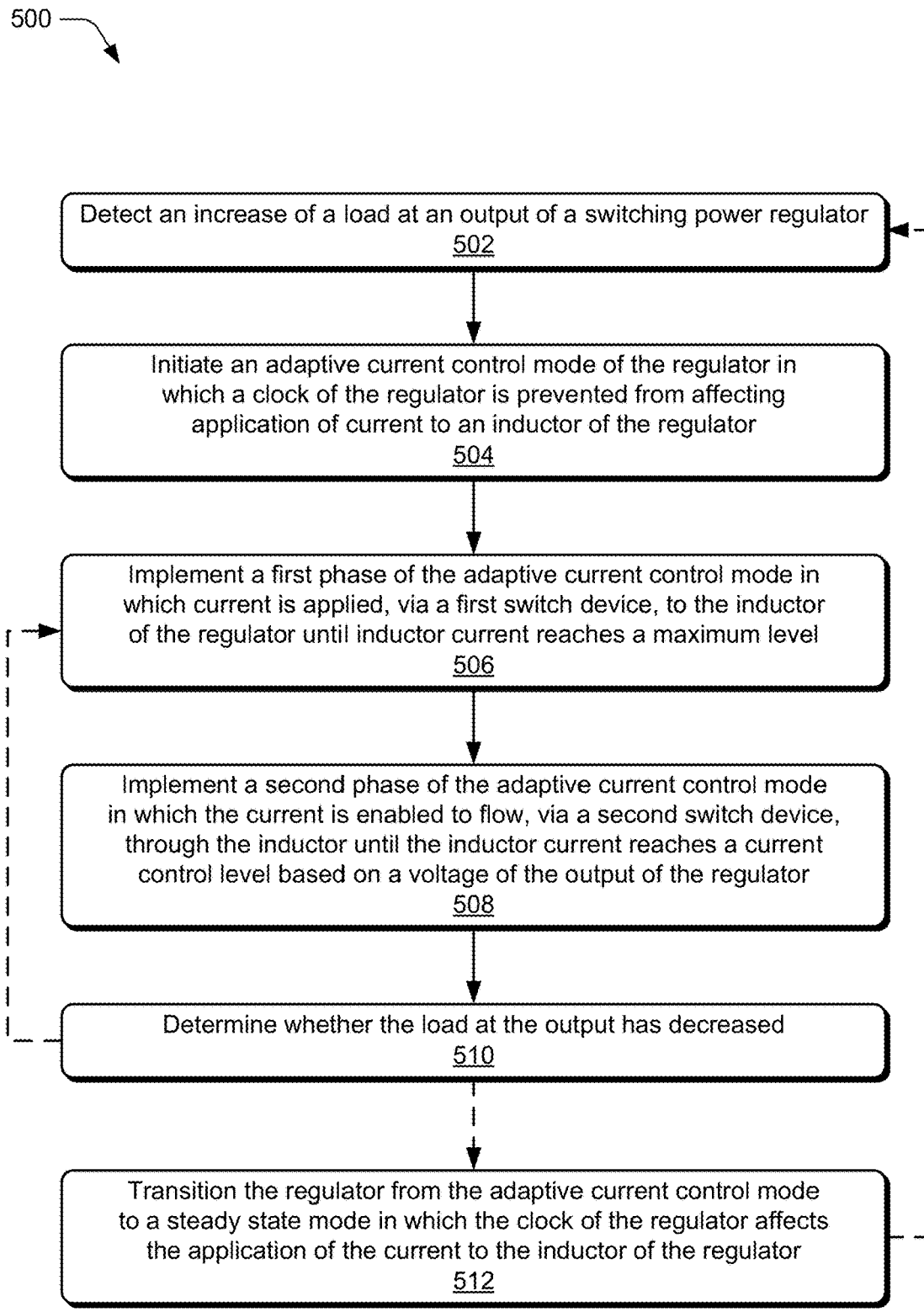
FIG. 5 illustrates an example method for implementing an adaptive current control mode for switching power regulators.

FIG. 5 illustrates an example method 500 for implementing an adaptive current control mode (e.g., hybrid-stitch mode), including operations performed by the current controller 122 and/or ACC circuitry 136. In some aspects, operations of the method 500 may be implemented by a power supply circuit of an electronic device to improve a response to a transient load on the power supply circuit effective to decrease or avoid output voltage droop.

At 502, an increase of a load is detected at an output of a switching power regulator (regulator). In some cases, the load is detected based on a voltage at the output of the regulator. For example, the load may be detected based on a transition of the switching regulator from a PFM mode to a PWM mode, output voltage dip detection, error voltage rising edge, error current of an operational transconductance amplifier, or a combination of the like.

At 504, an adaptive current control mode of the regulator is initiated. The adaptive current control mode prevents a clock of the regulator from affecting application of current to an inductor of the regulator. In some cases, the adaptive current control mode includes generating a variable-length pulse signal for masking a clock signal or offsetting a current control signal. In such cases, a magnitude of a predefined offset applied to the current control signal may be configured based on a magnitude of the load on the output of the switching regulator (e.g., a load-dependent offset). This may be effective to increase an average amount of the inductor current that flows through the inductor when operating in the adaptive current control mode.

At 506, a first phase of the adaptive current control mode is implemented. Generally, the first phase of the adaptive current control mode includes applying the current to the inductor of the regulator until inductor current reaches a maximum level. A first switch device or high-side switch device of the switching regulator may be activated or fully turned on to provide the current to the inductor. The inductor current may be measured via sense circuitry that is operably coupled to a terminal of the first switch device (e.g., source or drain).

At 508, a second phase of the adaptive current control mode is implemented. The second phase of the adaptive current control mode includes enabling the current to flow through the inductor until the inductor current reaches a current control level based on a voltage of the output of the regulator. A second switch device or low-side switch device of the switching regulator may be activated or fully turned on to enable the current to continue to flow through the inductor. The current flowing into the inductor may be measured via sense circuitry that is operably coupled to a terminal of the second switch device (e.g., source or drain).

At 510, a determination is made whether the load at the output of the switching regulator has decreased. A voltage level at the output of the circuit may be compared to a reference voltage to determine whether the load has decreased. In some cases, a current-based derivative of the current control signal is compared to a predefined ramp signal to detect the decrease in the load. In such cases, a magnitude or rate of increase of the predefined ramp signal may be set or configured based on a magnitude of the load at the output of the circuit (e.g., load-dependent ramp signal). Alternatively or additionally, setting the magnitude or the rate of increase of the predefined ramp signal may also be effective to alter a duration for which the switching regulator operates in the adaptive current control mode.

From operation 510, the method 500 may return to operation 506 to implement another iteration of the first phase of the adaptive current control mode. For example, if the transient load or load step still exceeds the current provided at the output by a threshold amount, the switching regulator may implement one or more additional iterations of the first phase and/or second phase of the adaptive current control mode to further increase the inductor current provided to the output. Alternatively, the method 500 may proceed to operation 512 to transition the switching regulator from the adaptive current control mode to a steady state mode. For example, a determination may be made that the load demand on the output of the switching regulator has decreased to a level that can be sustained by the steady state mode.

At operation 512, the switching regulator is transitioned from the adaptive current control mode to the steady state mode. In the steady state mode, such as a valley-current mode, the clock of the switching regulator affects or controls the application of the current to the inductor of the switching regulator. In some cases, the transition to the steady state mode includes unmasking the clock signal, enabling the clock, restoring a slope compensation signal, removing an offset from a current control signal, or the like. From operation 512 (e.g., after steady state operation resumes), the method 500 may return to operation 502 to initiate another iteration of the method 500, such as in response to another load step or transient load on the output of the switching regulator.

Figure 6A:
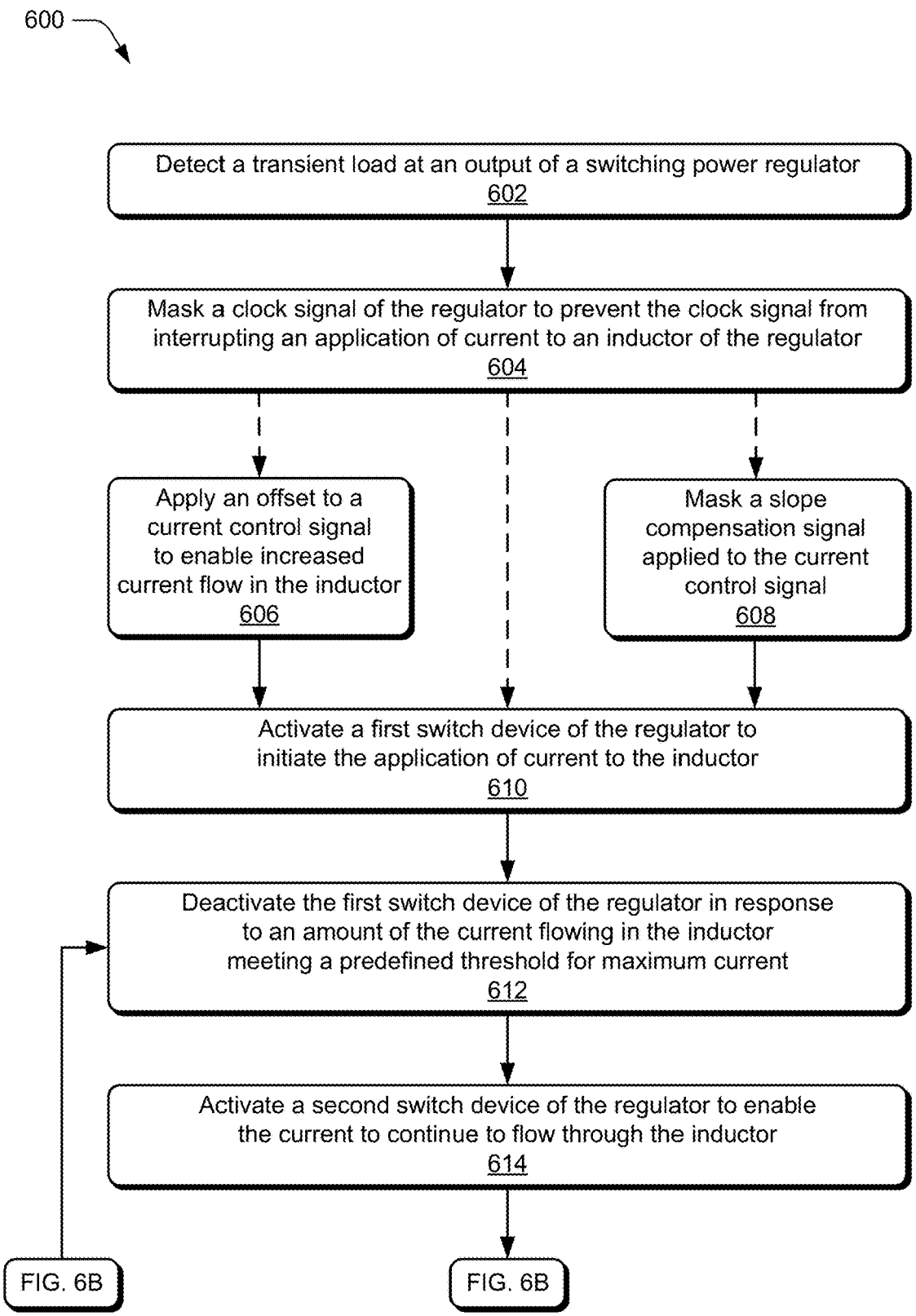
FIGS. 6A and 6B illustrate an example method masking a clock signal and activating switch devices of a switching power regulator to increase inductor current to an output of the switching power regulator.
Figure 6B:
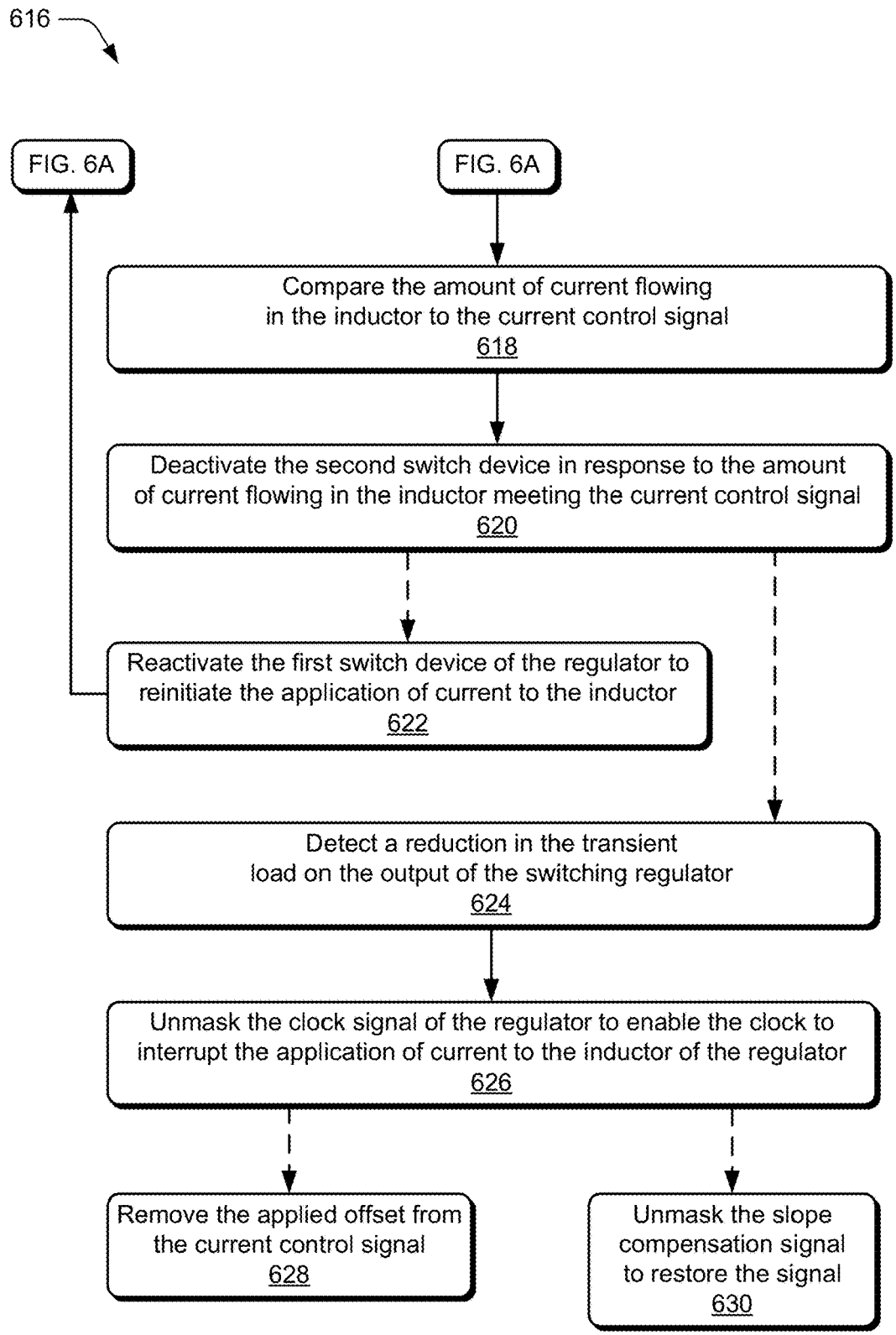

FIGS. 6A and 6B illustrates an example method 600 for masking a clock signal and activating switch devices of a switching regulator to increase inductor current to an output of the switching regulator. In various implementations, the current controller 122 and/or ACC circuitry 136 may perform or cause the operations of method 600.

At 602, a transient load is detected at an output of a switching regulator. The transient load may be detected in response to any suitable criteria, such as a PMIC of the switching regulator initiating a transition from a PFM mode to a PWM mode, a dip in output voltage at an output of the switching regulator, a rising edge of output voltage provided by an error amplifier, or a current-based output provided by an error amplifier configured as a transconductance operational amplifier.

By way of example, consider FIG. 7 which illustrates an example graph 700 of inductor current regulated in accordance with one or more aspects of adaptive current control. As shown in the graph 700, a transient load 702 is applied to the output of the switching regulator configured to implement adaptive current control. Here, assume the signals are described in reference to the single-phase switching regulator of FIG. 3 and that a PMIC of the switching regulator transitions from a PFM mode to a PWM mode in response to detecting a dip in output voltage.

At 604, a clock signal of the switching regulator is masked to prevent the clock signal from interrupting an application of current to an inductor of the switching regulator. In some implementations, a clock circuit may be disabled or deactivated to cause the clock circuit to cease generation of the clock signal. Optionally at 606, an offset is applied to a current control signal. The offset may be predefined or configurable based on the load applied to the output of the switching regulator. Generally, applying the offset to the current control signal is effective to increase an average amount of the current that flows in the inductor for at least a portion of time for which the clock signal is masked. In the context of the present example, the clock signal is masked at time 704 and a transient current offset is applied to error amplifier output at 706.

Optionally at 608, a slope compensation signal is masked. The slope compensation may be masked or blocked from being applied to the current control signal, such as in addition to the offset applied to the current control signal. In some cases, the slope compensation signal is masked or disabled in response to a pulse signal generated when the switching regulator operates in an adaptive current control mode. Masking or blocking the slope compensation signal may be effective to prevent the slope compensation signal from affecting an application of the current to the inductor of the switching regulator. With reference to FIG. 7, a compensation signal is masked from the error amplifier output at time 708, such as when the adaptive current control mode is initiated.

At 610, a first switch device of the switching regulator is activated to initiate the application of current to the inductor. The first switch device or a high-side switch device may be fully turned on to apply current from an input of the switching regulator to the inductor to ramp up inductor current. In some cases, an amount of the current flowing into or through the inductor is monitored via sense circuitry operably coupled to a terminal of the first switch device. In the context of the present example, a gate of a top or high-side switch device is activated at 710 to ramp current in the inductor of the switching regulator.

At 612, the first switch device of the switching regulator is deactivated in response to an amount of the current flowing in the inductor meeting a predefined threshold for maximum current. For example, the amount of current flowing into the inductor can be compared to the predefined threshold for maximum current to reset drive logic associated with the first switch device. In some aspects, the operations 610 and 612 are implemented as part of a first phase of an adaptive current control mode in which the application of current to the inductor current is regulated based on the threshold for maximum inductor current. Continuing the ongoing example, the gate of the top or high-side switch device is deactivated at 712 to cease the application of current to the inductor of the switching regulator.

At 614, a second switch device of the switching regulator is activated to enable the current to continue to flow through the inductor of the switching regulator. The second switch or a low-side switch device may be fully turned on to enable the current to flow through the inductor from a lower potential. As the current flows through the regulator, the amount of inductor current may decrease or decay over time. In some cases, the amount of the current flowing through the inductor is monitored via sense circuitry operably coupled to a terminal of the second switch device. In the context of the present example, a gate of a bottom or low-side transistor is activated at 714 to enable the current to flow through the inductor. From operation 614 shown in FIG. 6A, the method 600 proceeds as shown at 616 in FIG. 6B to operation 618.

At 618, the amount of current flowing in the inductor is compared to the current control signal. The current control signal or threshold may be a voltage signal or current signal provided based on a difference between the output voltage of the switching regulator and a reference voltage. The current control signal may also include an offset that is applied to increase an average amount of inductor current. At 620, the second switch device is deactivated in response to the amount of current flowing in the inductor meeting the current control signal. In some aspects, the operations 614, 618, and 620 are implemented as part of a second phase of an adaptive current control mode in which the inductor current (e.g., falling or decaying current) is regulated based on the offset current control signal. Continuing the present example, the gate of the bottom or low-side transistor is deactivated when the inductor current meets the transient current offset signal at 716 (e.g., error amplifier output plus offset).

Optionally at 622, the first switch device of the regulator is activated to reinitiate the application of current to the inductor. This may be effective to increase the amount of current flowing in the inductor and to the output of the regulator. In some cases, operation 622 is performed in response to determining that the transient load or load step still meets a predefined threshold (e.g., output voltage dip or voltage droop) for operating the switching regulator in the adaptive current control mode to provide increased amount of current. As shown at 718, the gate of the top transistor is activated again to ramp the current in the inductor until the peak current limit is reached again at 720.

Optionally at 624, a reduction in the transient load is detected on the output of the switching regulator. In some cases, a current or current mirror of the control signal provided by the error amplifier is compared to a predefined threshold for detecting the reduction in the load or transitioning the switching regulator to steady state operation. Alternatively or additionally, the predefined threshold may include a ramp signal having an initial magnitude and/or rate of increase that is configured based on a magnitude of the ramp signal (e.g., load-dependent ramp signal). Configuring the magnitude or the rate of increase of the predefined ramp signal may be effective to alter a duration for which the switching regulator operates in the adaptive current control mode.

Optionally at 626, the clock signal of the switching regulator is unmasked. This may enable the clock to interrupt or control the application of current to the inductor of the switching regulator. In other words, in response to the reduction of the load at the output of the switching regulator, the switching regulator may transition from the adaptive current control mode to steady state PWM operation in which the clock controls the application of current to the inductor. In some cases, the switching regulator enters a valley-current control mode at operation 626.

Optionally at 628, if applied, the offset is removed from the current control signal, such as to restore the current control signal for steady state operation. Optionally at 630, the slope compensation signal may also be unmasked to restore application of the signal to the current control signal. Concluding the present example, when the error amplifier output declines at 722, the clock signal is restored at 724 and the slope compensation signal is restored at 726 with the switching regulator transitions to fixed frequency operation at 728.

Figure 8:
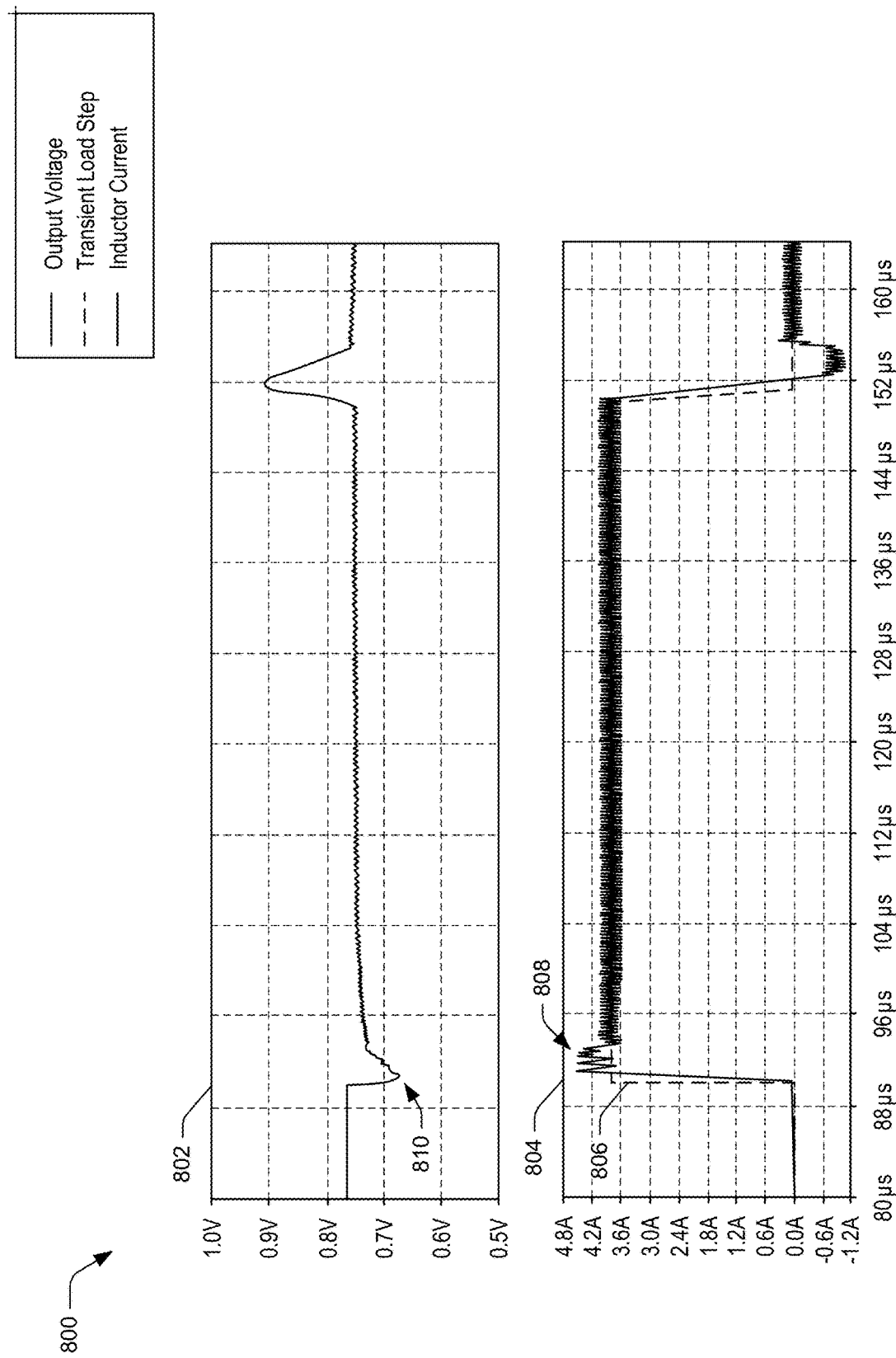
FIG. 8 illustrates example graphs of output voltage and inductor current of a switching power regulator that implements aspects of adaptive current control.

By implementing adaptive current control, voltage droop at the output of the switching regulator can be reduced for various levels of load steps. As another example, consider FIG. 8 which illustrates at 800 an example graph 802 of output voltage and an example graph 804 of inductor current for a switching regulator implementing adaptive current control. In response to a load step 806 of approximately 3.8 Amps, inductor current is ramped at 808 based on a peak or maximum current limit on an inductor of the switching regulator and an offset current control signal. By so doing, voltage droop 810 at the output of the switching regulator may be reduced by approximately 50 percent from a nominal voltage verses performance of conventional fixed frequency switching. For example, the voltage may droop from 750 mV to 680 mV (−10%) with adaptive current control whereas fixed frequency switching may typically droop to 590 mV (−21%), at which point CPU or GPU components may fail to operate.

Figure 9:
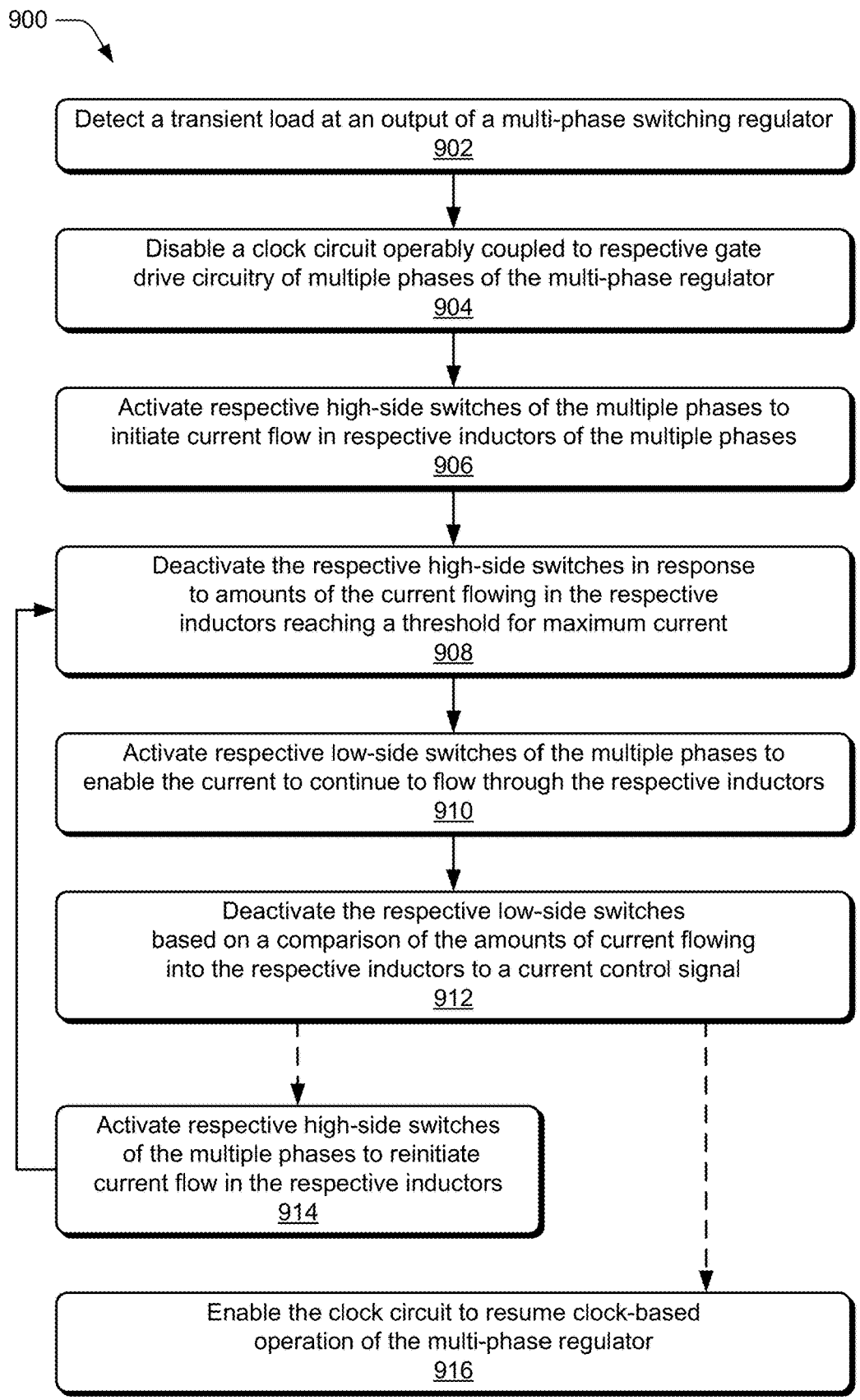
FIG. 9 illustrates an example method for aspects of implementing adaptive current control in multi-phase power switching regulators.

FIG. 9 illustrates an example method 900 for implementing adaptive current control in multi-phase power switching regulators, including operations performed by the current controller 122 and/or ACC circuitry 136. In some aspects, operations of the method 900 may be implemented by a multi-phase power supply circuit of an electronic device to improve a response to a transient load and reduce an amount of voltage droop associated with the transient load.

At 902, a transient load is detected at an output of a multi-phase switching regulator. The transient response may be detected based on one or more criteria, such as a transition from a PFM mode to a PWM mode, a dip in output voltage at an output of the switching regulator, a rising edge of output voltage provided by an error amplifier, or an increase of a current-based output provided by an error amplifier configured as a transconductance operational amplifier At 904, a clock circuit operably coupled to respective drive circuitry of multiple phases of the multi-phase switching regulator is disabled. In some cases, a clock signal to multiple phases of the multi-phase switching regulator is masked. An offset may also be applied to a current control signal that is based on the output voltage of the switching regulator. Alternatively or additionally, application of a slope compensation signal to the current control signal can be ceased while the clock circuit is disabled.

At 906, respective high-side switches of the multiple phases are activated to initiate current flow in respective inductors of the multiple phases. The high-side switches may be turned on concurrently to ramp respective current in the inductor of each of the multiple phases. At 908, the respective high-side switches of the multiple phases are deactivated in response to amounts of the current flowing in the respective inductors reaching a threshold for maximum current. For each phase, the amount of current flowing in the inductor may be compared to a threshold for maximum inductor current independent of other phases. In other words, each inductor of the multi-phase switching regulator may ramp to maximum current before being deactivated.

Figure 10:
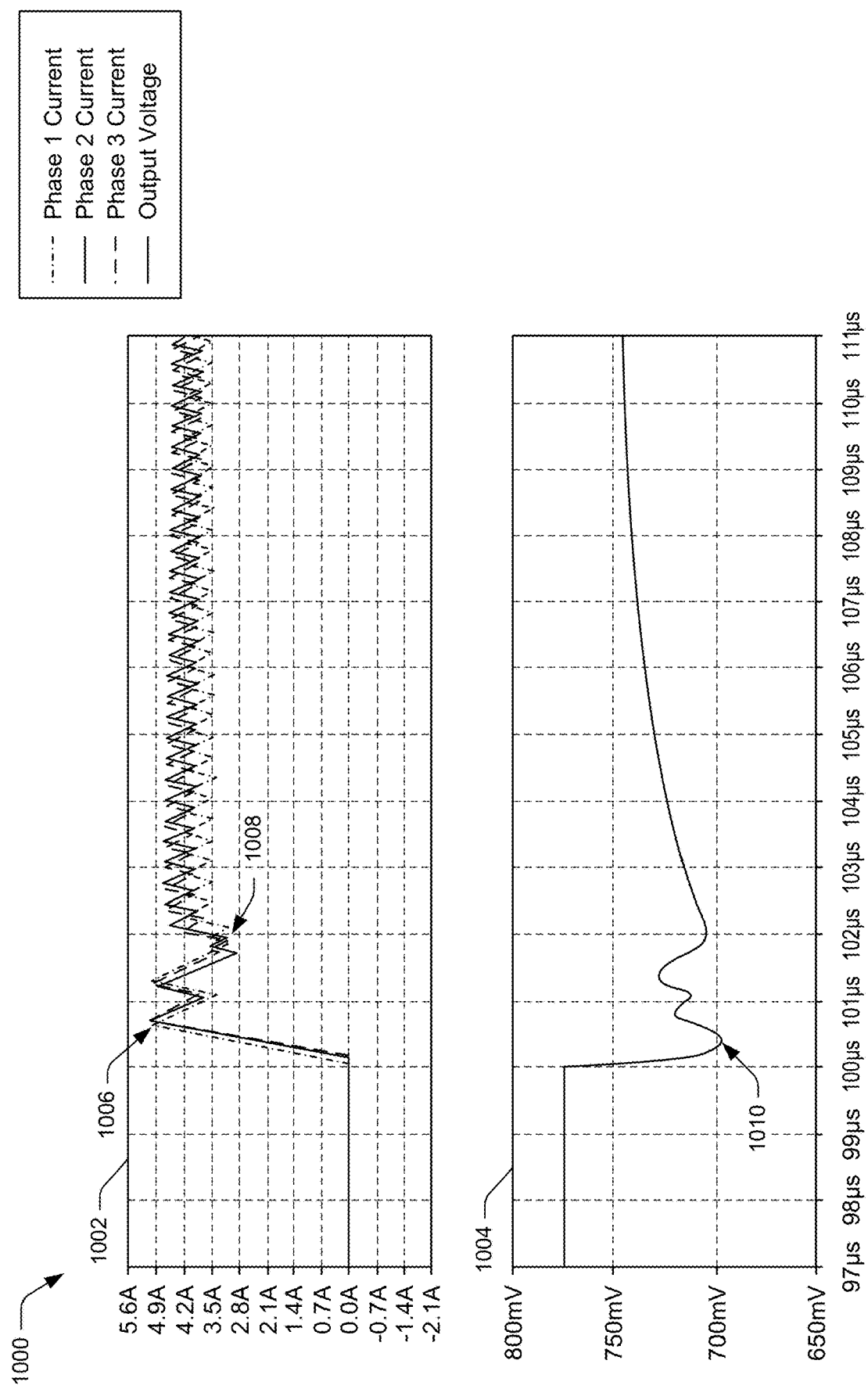
FIG. 10 illustrates additional example graphs of respective inductor phase current and output voltage of a multi-phase switching power regulator that implements aspects of adaptive current control.

By way of example, consider FIG. 10 which illustrates at 1000 an example inductor current graph 1002 and example output voltage graph 1004 of a multi-phase switching regulator implementing aspects of adaptive current control. In the context of a three-phase switching regulator, responsive to detecting a load step, high-side switches of all three phases are activated at 1006 to ramp respective inductor current until the currents reach a peak current limit. In other words, because a normal clock signal is deferred and the same peak current and error amplifier voltage (with offset) are used to control all inductor currents at the same time, all phases of the switching regulator can be commanded to reach the maximum inductor current ramp rate in order to increase current at the output of the regulator to response to the transient load. As shown in FIG. 10, with a load step dependent transient pulse derived (e.g., clock mask and offset signals), a phase shedding signal may also be masked to ensure that all phases operate at the same time. As such, the adaptive current control may not affect the phase shedding after the transient load subsides, which in turn minimizes impact on overall efficiency of the switching regulator.

At 910, respective low-side switches of the multiple phases are activated to enable the current to continue to flow through the respective inductors. The low-side switch of each of the multiple-phases may be activated independent of the other low-side switch, such as when the maximum current threshold is reached for a corresponding inductor. At 912, the respective low-side switches of the multiple phases are deactivated based on a comparison of the amounts of current flowing into the respective inductors to a current control signal provided by an error amplifier. In some cases, the current control signal is offset or increased to enable a higher amount of average current flow through the respective inductors.

Optionally at 914, the respective high-side switches of the multiple phases are activated to reinitiate current flow in the respective inductors. This may be effective to increase the amount of current flowing to the output of the regulator. In some cases, operation 914 is performed in response to determining that the transient load or load step still meets a predefined threshold (e.g., output voltage dip or voltage droop) for operating the multi-phase switching regulator in an adaptive current control mode. In the context of FIG. 10, a current controller reactivates the high-side switches of the three phases to reinitiate current flow and again ramp the current in the respective inductors until the peak current limit is reached to increase current flow to the output of the multi-phase switching regulator.

Optionally at 916, the clock circuit is enabled to resume clock-based operation of the multi-phase regulator. In some cases, the clock circuit is enabled in response to determining that the transient load or transient step on the output of the multi-phase switching regulator has decreased or subsided. Enabling the clock circuit may include unmasking a clock signal of the switching regulator to implement clock-based or fixed frequency control of the switching regulator. Alternatively or additionally, application of the offset to the current control signal may be ceased and/or application of the slope compensation signal to the current control signal may be resumed.

Concluding the present example, the three-phase switching regulator returns to steady state operation at 1008 after recovering from a droop 1010 in output voltage. Here, note that by implementing adaptive current control, the multi-phase switching regulator may achieve similar voltage droop performance (−10% nominal voltage) with one third of an amount of output capacitance typically used by a fixed frequency switching regulator. As such, aspects of adaptive current control may reduce cost, manufacturing complexity, and design space associated with switching regulator output capacitance by approximately 66% in some implementations. This in turn may improve price, battery life, and competitiveness of devices with switching regulators that implement adaptive current control.

Figure 11:
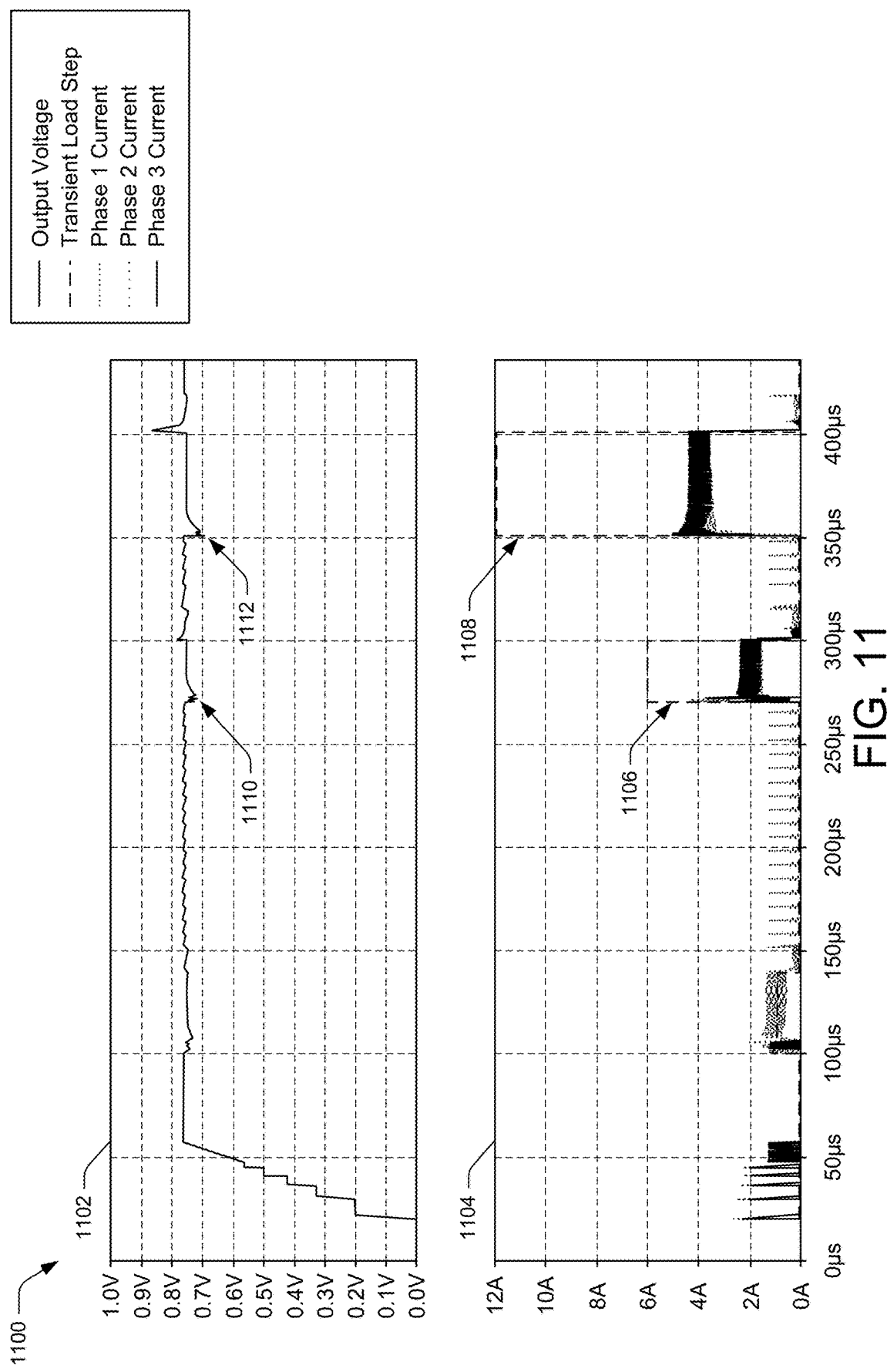
FIG. 11 illustrates example graphs of output voltage and respective inductor phase current of a multi-phase switching power regulator that implements aspects of adaptive current control.

As another example, consider FIG. 11 which illustrates at 1100 an example output voltage graph 1102 and an example inductor current graph 1104 for a multi-phase switching regulator implementing adaptive current control. In the example, a load step 1106 of 6 Amps and a load step 1108 of 12 Amps with a slew rate of 120 A/μSec are applied to an output of the multi-phase switching regulator. As shown, the implementation of adaptive current control greatly improves transient response to these large load steps. By ramping inductor current in three inductors of the multi-phase switching regulator, the voltage droop at 1110 and 1112 is reduced to prevent disruption of components, such as CPUs and GPUs, coupled to the output of the multi-phase switching regulator. By so doing, this may preclude the need to throttle current-intensive CPU/GPU components, resulting in improved or maintained device performance and improve user experience.

Example Systems

Figure 12:
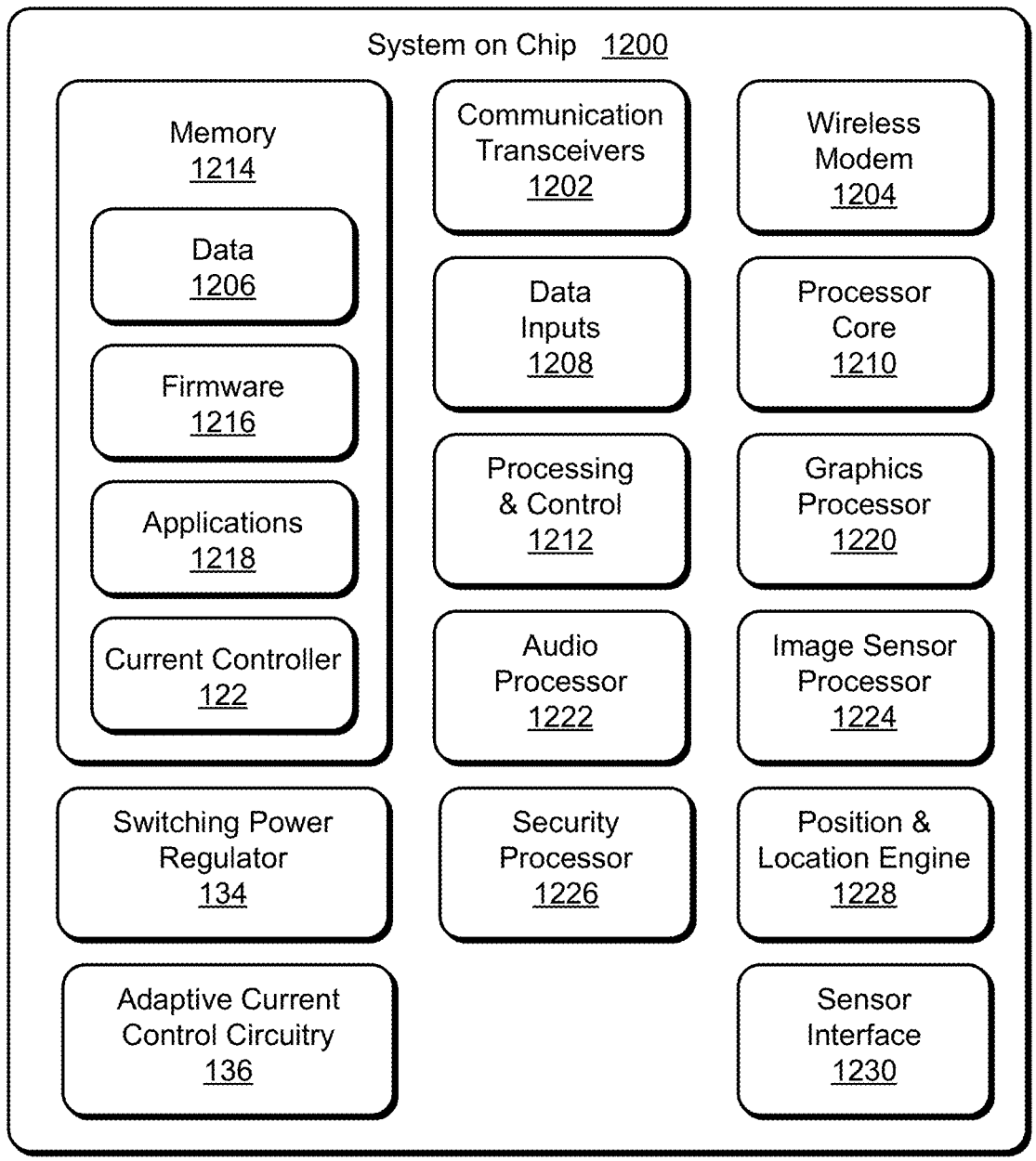
FIG. 12 illustrates an example system on chip (SoC) environment in which techniques of adaptive current control for fast transient response may be implemented.

FIG. 12 illustrates an example system on chip (SoC) that may implement aspects of adaptive current control for transient load response. The SoC 1200 may be embodied as or within any type of user device 102, user equipment, apparatus, other device, or system as described with reference to FIGS. 1-11 to implement adaptive current control. Although described with reference to chip-based packaging, the components shown in FIG. 12 may also be embodied as other systems or component configurations, such as, and without limitation, a power management integrated-circuit (PMIC), a power regulation circuit, switch-mode power supply (SMPS), a Field-Programmable Gate Array (FPGA), an Application-Specific Integrated Circuit (ASIC), an Application-Specific Standard Product (ASSP), a digital signal processor (DSP), Complex Programmable Logic Devices (CPLD), system in package (SiP), package on package (PoP), processing and communication chip set, communication co-processor, sensor co-processor, or the like.

In this example, the SoC 1200 includes communication transceivers 1202 and a wireless modem 1204 that enable wired or wireless communication of data 1206 (e.g., received data, data that is being received, data scheduled for broadcast, packetized, or the like). In some aspects, the wireless modem 1204 is implemented as a multi-mode multi-band modem or baseband processor that is configurable to communicate in accordance with various communication protocols and/or in different frequency bands. The wireless modem 1204 may include a transceiver interface (not shown) for communicating encoded or modulated signals with transceiver circuitry, and/or controlling a radio frequency (RF) front end.

The data 1206 or other system content can include configuration settings of the system or various components (e.g., various current thresholds as described herein), media content stored by the system, and/or information associated with a user of the system. Media content stored on the system on chip 1200 may include any type of audio, video, and/or image data. The system on chip 1200 also includes one or more data inputs 1208 via which any type of data, media content, and/or inputs can be received, such as user input, user-selectable inputs (explicit or implicit), or any other type of audio, video, and/or image data received from a content and/or data source. Alternatively or additionally, the data inputs 1208 may include various data interfaces, which can be implemented as any one or more of a serial and/or parallel interface, a wireless interface, a network interface, and as any other type of communication interface enabling communication with other devices or systems.

The system on chip 1200 includes one or more processor cores 1210, which process various computer-executable instructions to control the operation of the system on chip 1200 and to enable techniques of adaptive current control for fast transient response. Alternatively or additionally, the system on chip 1200 can be implemented with any one or combination of hardware, firmware, or fixed logic circuitry that is implemented in connection with processing and control circuits, which are generally shown at 1212. Although not shown, the system on chip 1200 may also include a bus, interconnect, crossbar, or fabric that couples the various components within the system.

The system 1200 also includes a memory 1214 (e.g., computer-readable media), such as one or more memory circuits that enable persistent and/or non-transitory data storage, and thus do not include transitory signals or carrier waves. Examples of the memory 1214 include ROM, RAM, DRAM, SRAM, or Flash memory. The memory 1214 provides data storage for the system data 1206, as well as for firmware 1216, applications 1218, and any other types of information and/or data related to operational aspects of the system on chip 1200. For example, the firmware 1216 can be maintained as processor-executable instructions of an operating system (e.g., real-time OS) within the memory 1214 and executed on one or more of the processor cores 1210.

The applications 1218 may include a system manager, such as any form of a control application, software application, signal-processing and control module, code that is native to a particular system, an abstraction module or gesture module and so on. The memory 1214 may also store system components or utilities for implementing aspects of adaptive current control for fast transient response, such as an adaptive current controller 122 (current controller 122) and registers of configurable current thresholds and offsets (not shown). The current controller 122 and registers may be embodied as combined or separate components, examples of which are described with reference to corresponding entities or functionality as illustrated in FIGS. 1-11.

In some aspects, the system on chip 1200 also includes additional processors or co-processors to enable other functionalities, such as a graphics processor 1220, audio processor 1222, and image sensor processor 1224. The graphics processor 1220 may render graphical content associated with a user interface, operating system, or applications of the system on chip 1200. In some cases, the audio processor 1222 encodes or decodes audio data and signals, such as audio signals and information associated with voice calls or encoded audio data for playback. The image sensor processor 1224 may be coupled to an image sensor and provide image data processing, video capture, and other visual media conditioning and processing functions.

The processors and co-processors of the system on chip 1200 may be operably coupled with an instance of a switching regulator 134 embodied in or with the system on chip 1200. The switching regulator 134 may include a single-phase or multi-phase switching regulator as described with reference to FIGS. 1-11. The system on chip 1200 is also implemented with ACC circuitry 136, which is operably coupled to the switching regulators 134 and current controller 122. In some aspects, the current controller 122 and adaptive current control circuitry 136 may interact with the switching regulators 134 to implement adaptive current control in the system on chip 1200 for fast transient response as described herein.

The system on chip 1200 may also include a security processor 1226 to support various security, encryption, and cryptographic operations, such as to provide secure communication protocols and encrypted data storage. Although not shown, the security processor 1226 may include one or more cryptographic engines, cipher libraries, hashing modules, or random number generators to support encryption and cryptographic processing of information or communications of the system on chip 1200. Alternatively or additionally, the system on chip 1200 can include a position and location engine 1228 and a sensor interface 1230. Generally, the position and location engine 1228 may provide positioning or location data by processing signals of a Global Navigation Satellite System (GNSS) and/or other motion or inertia sensor data (e.g., dead-reckoning navigation). The sensor interface 1230 enables the system on chip 1200 to receive data from various sensors, such as capacitance and motion sensors.

Variations

Although the above-described apparatuses and methods are described in the context of adaptive current control for switching power regulators of user devices, power circuitry, and electronic systems, the described devices, systems, and methods are non-limiting and may apply to other contexts, user device configurations, or power conversion environments.

Generally, the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, PMICs, FPGAs, ASICs, ASSPs, SoCs, CPLDs, co-processors, context hubs, motion co-processors, sensor co-processors, or the like.

In a first method implemented by a switching power regulator to increase output current in response to an increase of a load on the switching power regulator comprises detecting the increase of the load at an output of the switching power regulator, initiating, in response to the increase of the load, an adaptive current control mode of the switching power regulator in which a clock of the switching power regulator is prevented from affecting application of current to an inductor of the switching power regulator, implementing a first phase of the adaptive current control mode in which the current is applied, via a first switch device and from an input of the switching power regulator, to an inductor of the switching power regulator until inductor current reaches a predefined level for maximum current, implementing a second phase of the adaptive current control mode in which the current is enabled to flow, via a second switch device and from a potential lower than the input of the switching power regulator, through the inductor until the inductor current reaches a current control signal that is based on an output voltage of the switching power regulator, detecting a reduction of the load at the output while the switching power regulator operates in the adaptive current control mode, and transitioning, in response to the reduction of the load at the output, the switching power regulator to operate in a steady state mode in which the clock of the switching power regulator affects the application of the current to the inductor of the switching power regulator.

In addition to the above described first method, an apparatus for regulating power comprises a first switch device coupled to an input of the circuit, an inductor having a first terminal coupled to the first switch device and a second terminal coupled to an output of the circuit, a second switch coupled between the first terminal of the inductor and a potential lower than the input of the circuit, first and second sense circuitry configured to provide first and second indications of current flow through the first and second switch devices, respectively, a clock operably coupled to drive circuitry of the first switch device and the second switch device, a current comparator having an output operably coupled to the drive circuitry and a first input operably coupled to the second sense circuitry, an error amplifier having an input operably coupled to the output of the circuit and an output coupled to a second input of the current comparator, and an adaptive current controller. The adaptive current controller is configured to detect an increase of a load at the output of the circuit, cause, in response to the increase of the load, the circuit to operate in an adaptive current control mode in which the clock of the circuit is prevented from affecting application of current to the inductor of the circuit, implement a first phase of the adaptive current control mode in which the current is applied, via the first switch device, to the inductor until the first indication of current flow through the inductor reaches a predefined level for maximum inductor current, implement a second phase of the adaptive current control mode in which the current is enabled to flow, via the second switch device, through the inductor until the current comparator determines that the second indication of current flow through the inductor reaches a current control signal provided via the output of the error amplifier, detect a reduction of the load at the output while the circuit operates in the adaptive current control mode, and transition, in response to the reduction of the load at the output, the circuit from the adaptive current control mode to operate in a steady state mode in which the clock of the circuit affects the application of the current to the inductor of the circuit.

In addition to the above described method and apparatus, a second method implemented by a switching power regulator to increase output current in response to a transient load on the switching power regulator comprises detecting the transient load at an output of the switching power regulator, masking, in response to detecting the transient load, a clock signal of the switching power regulator to prevent the clock signal from interrupting an application of current to an inductor of the switching power regulator, activating a first switch device of the switching power regulator to initiate the application of the current to the inductor of the switching power regulator, sensing, at a first node operably coupled to the first switch device, an amount of the current flowing in the inductor to provide a first indication of current flow in the inductor, deactivating the first switch device in response to the first indication of current flow meeting a predefined threshold for maximum inductor current, activating, in response to deactivating the first switch device, a second switch device of the switching power regulator to enable the current to continue flow through the inductor, sensing, at a second node operably coupled to the second switch device, the amount of current flowing in the inductor to provide a second indication of current flow in the inductor, comparing, when the second switch device is activated, the second indication of current flow to a control signal that is based on an output voltage of the switching power regulator, deactivating the second switch device in response to the second indication of current flow meeting the control signal that is based on the output voltage of the switching power regulator, and activating the first switch device to reinitiate the application of the current to the inductor of the switching power regulator effective to increase the amount of the current flowing in the inductor and to the output of the switching power regulator.

In addition to any of the methods or apparatus described above, operating the switching power regulator in the adaptive current control mode further comprises applying a predefined offset to the current control signal effective to increase an average amount of the inductor current that flows through the inductor.

In addition to any of the methods or apparatus described above, operating the switching power regulator in the adaptive current control mode further comprises comparing a current-based derivative of the current control signal to a predefined ramp signal to detect the reduction of the load at the output.

In addition to any of the methods or apparatus described above, operating the switching power regulator in the adaptive current control mode further comprises masking a slope compensation signal applied to the current control signal during operation in the steady state mode to prevent the slope compensation signal from affecting the application of current to the inductor.

In addition to any of the methods or apparatus described above, configuring a magnitude of the predefined offset applied to the current control signal based on a magnitude of the load at the output of the switching power regulator, or configuring a magnitude or rate of increase of the predefined ramp signal to which the derivative of the current control signal is compared based on the magnitude of the load at the output of the switching power regulator.

In addition to any of the methods or apparatus described above, implementing the first phase of the adaptive current control mode includes sensing, at a first node operably coupled to the first switch device, an amount of the current applied to the inductor of the switching power regulator to provide a first indication of the inductor current, and deactivating the first switch device in response to the first indication of inductor current flow meeting a predefined threshold for the level of maximum current; or implementing the second phase of the adaptive current control mode includes sensing, at a second node operably coupled to the second switch device, an amount of the current flowing through the inductor of the switching power regulator to provide a second indication of the inductor current, and comparing, when the second switch device is activated, the second indication of the inductor current to the control signal that is based on the output voltage of the switching power regulator.

In addition to any of the methods or apparatus described above, detecting the increase of the load at the output of the switching power regulator based on at least one of a transition of the switching power regulator from a PFM mode to a PWM mode, a dip in output voltage at the output of the switching power regulator, a rising edge of output voltage provided by an error amplifier operably coupled to the output of the switching power regulator to provide the current control signal, or a current-based output provided by the error amplifier operably coupled to the output of the switching power regulator.

In addition to any of the methods or apparatus described above, circuitry configured to apply an offset to the output signal of the error amplifier effective to increase an average amount of the current that flows in the inductor for at least a portion of time for which the circuit operates in the adaptive current control mode.

In addition to any of the methods or apparatus described above, the circuitry further comprising at least one logic gate configured to generate the offset in response to detecting the transient load at the output of the circuit, and a comparator configured to compare a current-based indication of voltage at the output of the circuit with a predefined ramp signal for transitioning the circuit to the steady state mode or ceasing generation of the offset, and transition the circuit to the steady state mode in response to the current-based indication no longer exceeding the predefined ramp signal, or cease to generate the offset in response to the current-based indication no longer exceeding the predefined threshold.

In addition to any of the methods or apparatus described above, the adaptive current controller is further configured to set a magnitude of the offset applied to the current control signal based on a magnitude of the load at the output of the circuit, or set a magnitude or rate of increase of the predefined ramp signal to which the current-based indication of the voltage is compared based on the magnitude of the load at the output of the circuit.

In addition to any of the methods or apparatus described above, setting the magnitude or the rate of increase of the predefined ramp signal is effective to alter a duration for which the circuit operates in the adaptive current control mode based on the magnitude of the load at the output of the circuit.

In addition to any of the methods or apparatus described above, the circuit is configured as a multi-phase power regulation circuit, the first switch device, the inductor, the second switch device, and current comparator are configured as a first phase of the multi-phase power regulation circuit, the multi-phase power regulation circuit includes at least a second phase having another inductor, and during operation in the adaptive current control mode, the clock of the circuit is prevented from affecting application of current to at least the inductor of the first phase and the other inductor of the at least second phase of the multi-phase power regulation circuit.

In addition to any of the methods or apparatus described above, applying an offset to the control signal effective to increase an average amount of the current that flows in the inductor for at least a portion of time during which the clock signal is masked, and/or configuring, based on a magnitude of the transient load at the output of the switching power regulator, the offset that is applied to the control signal such that a magnitude of the offset corresponds to the magnitude of the transient load at the output of the switching power regulator.

In addition to any of the methods or apparatus described above, generating the offset in response to detecting the transient load at the output of the switching power regulator, comparing a current that corresponds to the control signal that is based on the output voltage to a predefined threshold for unmasking the clock signal or ceasing generation of the offset, and unmasking the clock signal in response to the current no longer exceeding the predefined threshold, or ceasing to generate the offset in response to the current no longer exceeding the predefined threshold.

In addition to any of the methods or apparatus described above, the predefined threshold is a ramp signal that increases over time and further comprising generating the ramp signal based on a predefined setting for a rate at which the ramp signal increases or a magnitude of the ramp signal, and/or configuring, based on a magnitude of the transient load at the output of the switching power regulator, the predefined setting for the rate or the magnitude of the ramp signal.

In addition to any of the methods or apparatus described above, ceasing, while the offset is applied to the control signal, to apply a slope compensation signal to the control signal that is based on the output voltage of the switching power regulator effective to prevent the slope compensation signal from affecting the application of the current to the inductor of the switching power regulator.

In addition to any of the methods or apparatus described above, detecting a reduction in the transient load at the output of the switching power regulator and in response to detecting the reduction in the transient load: unmasking the clock signal of the switching power regulator to implement clock-based control of the switching power regulator based on at least the clock signal and the second indication of current flow in the inductor, ceasing to apply the offset to the control signal that is based on the output voltage of the switching power regulator, or resuming application of the slope compensation signal to the control signal that is based on the output voltage of the power.

What is claimed is:

1. A method implemented by a switching power regulator to increase output current in response to an increase of a load on the switching power regulator, the method comprising:
   detecting the increase of the load at an output of the switching power regulator;
   initiating, in response to the increase of the load, an adaptive current control mode of the switching power regulator in which a clock of the switching power regulator is prevented from affecting application of current to an inductor of the switching power regulator;
   implementing a first phase of the adaptive current control mode in which the current is applied, via a first switch device and from an input of the switching power regulator, to the inductor of the switching power regulator until inductor current reaches a predefined level for maximum current;

implementing a second phase of the adaptive current control mode in which the current is enabled to flow, via a second switch device and from a potential lower than the input of the switching power regulator, through the inductor until the inductor current reaches a current control signal that is based on an output voltage of the switching power regulator;

detecting a reduction of the load at the output while the switching power regulator operates in the adaptive current control mode; and transitioning, in response to the reduction of the load at the output, the switching power regulator to operate in a steady state mode in which the clock of the switching power regulator affects the application of the current to the inductor of the switching power regulator.

2. The method as recited by claim 1, wherein operating the switching power regulator in the adaptive current control mode further comprises applying a predefined offset to the current control signal effective to increase an average amount of the inductor current that flows through the inductor.

3. The method as recited by claim 2, further comprising configuring a magnitude of the predefined offset applied to the current control signal based on a magnitude of the load at the output of the switching power regulator.

4. The method as recited by claim 1, wherein operating the switching power regulator in the adaptive current control mode further comprises comparing a current-based derivative of the current control signal to a predefined ramp signal to detect the reduction of the load at the output.

5. The method as recited by claim 4, further comprising configuring a magnitude or rate of increase of the predefined ramp signal to which the derivative of the current control signal is compared based on the magnitude of the load at the output of the switching power regulator.

6. The method as recited by claim 1, wherein operating the switching power regulator in the adaptive current control mode further comprises masking a slope compensation signal applied to the current control signal during operation in the steady state mode to prevent the slope compensation signal from affecting the application of current to the inductor.

7. The method as recited by claim 1, wherein:
implementing the first phase of the adaptive current control mode includes:
sensing, at a first node operably coupled to the first switch device, an amount of the current applied to the inductor of the switching power regulator to provide a first indication of the inductor current; and
deactivating the first switch device in response to the first indication of inductor current flow meeting a predefined threshold for the level of maximum current; or
implementing the second phase of the adaptive current control mode includes:
sensing, at a second node operably coupled to the second switch device, an amount of the current flowing through the inductor of the switching power regulator to provide a second indication of the inductor current; and
comparing, when the second switch device is activated, the second indication of the inductor current to the control signal that is based on the output voltage of the switching power regulator.

8. The method as recited by claim 1, further comprising detecting the increase of the load at the output of the switching power regulator based on at least one of:
a transition of the switching power regulator from a pulse-frequency modulation (PFM) mode to a pulse-width modulation (PWM) mode;
a dip in output voltage at the output of the switching power regulator;
a rising edge of output voltage provided by an error amplifier operably coupled to the output of the switching power regulator to provide the current control signal; or
a current-based output provided by the error amplifier operably coupled to the output of the switching power regulator.

9. A circuit for regulating power comprising:
a first switch device coupled to an input of the circuit;
an inductor having a first terminal coupled to the first switch device and a second terminal coupled to an output of the circuit;
a second switch coupled between the first terminal of the inductor and a potential lower than the input of the circuit;
first and second sense circuitry configured to provide first and second indications of current flow through the first and second switch devices, respectively;
a clock operably coupled to drive circuitry of the first switch device and the second switch device;
a current comparator having an output operably coupled to the drive circuitry and a first input operably coupled to the second sense circuitry;
an error amplifier having an input operably coupled to the output of the circuit and an output coupled to a second input of the current comparator; and
an adaptive current controller configured to:
detect an increase of a load at the output of the circuit;
cause, in response to the increase of the load, the circuit to operate in an adaptive current control mode in which the clock of the circuit is prevented from affecting application of current to the inductor of the circuit;
implement a first phase of the adaptive current control mode in which the current is applied, via the first switch device, to the inductor until the first indication of current flow through the inductor reaches a predefined level for maximum inductor current;
implement a second phase of the adaptive current control mode in which the current is enabled to flow, via the second switch device, through the inductor until the current comparator determines that the second indication of current flow through the inductor reaches a current control signal provided via the output of the error amplifier;
detect a reduction of the load at the output while the circuit operates in the adaptive current control mode; and
transition, in response to the reduction of the load at the output, the circuit from the adaptive current control mode to operate in a steady state mode in which the clock of the circuit affects the application of the current to the inductor of the circuit.

10. The circuit as recited by claim 9, further comprising circuitry configured to apply an offset to the output signal of the error amplifier effective to increase an average amount of the current that flows in the inductor for at least a portion of time for which the circuit operates in the adaptive current control mode.

11. The circuit as recited by claim 10, wherein the circuitry further comprises:
at least one logic gate configured to generate the offset in response to detecting the transient load at the output of the circuit; and
a comparator configured to:
compare a current-based indication of voltage at the output of the circuit with a predefined ramp signal for transitioning the circuit to the steady state mode or ceasing generation of the offset; and
transition the circuit to the steady state mode in response to the current-based indication no longer exceeding the predefined ramp signal; or
cease to generate the offset in response to the current-based indication no longer exceeding the predefined threshold.

12. The circuit as recited by claim 11, wherein the adaptive current controller is further configured to:
set a magnitude of the offset applied to the current control signal based on a magnitude of the load at the output of the circuit; or
set a magnitude or rate of increase of the predefined ramp signal to which the current-based indication of the voltage is compared based on the magnitude of the load at the output of the circuit.

13. The circuit as recited by claim 12, the setting of the magnitude or the setting of the rate of increase of the predefined ramp signal by the adaptive current controller is effective to alter a duration for which the circuit operates in the adaptive current control mode based on the magnitude of the load at the output of the circuit.

14. The circuit as recited by claim 9, wherein:
the circuit is configured as a multi-phase power regulation circuit;
the first switch device, the inductor, the second switch device, and current comparator are configured as a first phase of the multi-phase power regulation circuit;
the multi-phase power regulation circuit includes at least a second phase having another inductor; and
during operation in the adaptive current control mode, the clock of the circuit is prevented from affecting application of current to at least the inductor of the first phase and the other inductor of the at least second phase of the multi-phase power regulation circuit.

15. A method implemented by a switching power regulator to increase output current in response to a transient load on the switching power regulator, the method comprising:
detecting the transient load at an output of the switching power regulator;
masking, in response to detecting the transient load, a clock signal of the switching power regulator to prevent the clock signal from interrupting an application of current to an inductor of the switching power regulator;
activating a first switch device of the switching power regulator to initiate the application of the current to the inductor of the switching power regulator;
sensing, at a first node operably coupled to the first switch device, an amount of the current flowing in the inductor to provide a first indication of current flow in the inductor;
deactivating the first switch device in response to the first indication of current flow meeting a predefined threshold for maximum inductor current;
activating, in response to deactivating the first switch device, a second switch device of the switching power regulator to enable the current to continue flow through the inductor;
sensing, at a second node operably coupled to the second switch device, the amount of current flowing in the inductor to provide a second indication of current flow in the inductor;
comparing, when the second switch device is activated, the second indication of current flow to a control signal that is based on an output voltage of the switching power regulator;
deactivating the second switch device in response to the second indication of current flow meeting the control signal that is based on the output voltage of the switching power regulator; and
activating the first switch device to reinitiate the application of the current to the inductor of the switching power regulator effective to increase the amount of the current flowing in the inductor and to the output of the switching power regulator.

16. The method as recited by claim 15, further comprising:
applying an offset to the control signal effective to increase an average amount of the current that flows in the inductor for at least a portion of time during which the clock signal is masked; or
configuring, based on a magnitude of the transient load at the output of the switching power regulator, the offset that is applied to the control signal such that a magnitude of the offset corresponds to the magnitude of the transient load at the output of the switching power regulator.

17. The method as recited by claim 16, further comprising:
generating the offset in response to detecting the transient load at the output of the switching power regulator;
comparing a current that corresponds to the control signal that is based on the output voltage to a predefined threshold for unmasking the clock signal or ceasing generation of the offset; and
unmasking the clock signal in response to the current no longer exceeding the predefined threshold; or
ceasing to generate the offset in response to the current no longer exceeding the predefined threshold.

18. The method as recited by claim 17, wherein the predefined threshold is a ramp signal that increases over time and the method further comprises:
generating the ramp signal based on a predefined setting for a rate at which the ramp signal increases or a magnitude of the ramp signal; and
configuring, based on a magnitude of the transient load at the output of the switching power regulator, the predefined setting for the rate or the magnitude of the ramp signal.

19. The method as recited by claim 17, further comprising detecting a reduction in the transient load at the output of the switching power regulator and in response to detecting the reduction in the transient load: unmasking the clock signal of the switching power regulator to implement clock based control of the switching power regulator based on at least the clock signal and the second indication of current flow in the inductor, ceasing to apply the offset to the control signal that is based on the output voltage of the switching power regulator, or resuming application of the slope compensation signal to the control signal that is based on the output voltage of the power.

20. The method as recited by claim 15, further comprising, ceasing, while the offset is applied to the control signal, to apply a slope compensation signal to the control signal that is based on the output voltage of the switching power regulator effective to prevent the slope compensation signal from affecting the application of the current to the inductor of the switching power regulator.

\* \* \* \* \*

UNITED STATES PATENT AND TRADEMARK OFFICE
CERTIFICATE OF CORRECTION

| | |
|---|---|
| PATENT NO. | : 11,929,680 B2 |
| APPLICATION NO. | : 17/636891 |
| DATED | : March 12, 2024 |
| INVENTOR(S) | : Wei Shen |

Page 1 of 1

It is certified that error appears in the above-identified patent and that said Letters Patent is hereby corrected as shown below:

In the Claims

Column 30, Line 56, Claim 19: After "implement", delete "clock based" add --clock-based--

Signed and Sealed this
Thirtieth Day of April, 2024

*Katherine Kelly Vidal*

Katherine Kelly Vidal
*Director of the United States Patent and Trademark Office*